United States Patent
Wilkinson et al.

(10) Patent No.: US 10,033,666 B2
(45) Date of Patent: Jul. 24, 2018

(54) TECHNIQUES FOR VIRTUAL ETHERNET SWITCHING OF A MULTI-NODE FABRIC

(71) Applicant: Intel Corporation, Santa Clara, CA (US)

(72) Inventors: Hugh Wilkinson, Newton, MA (US); James C. Wright, Sewell, NJ (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 15/195,932

(22) Filed: Jun. 28, 2016

(65) Prior Publication Data

US 2017/0373991 A1    Dec. 28, 2017

(51) Int. Cl.

| | | |
|---|---|---|
| H04L 29/12 | (2006.01) | |
| H04L 12/931 | (2013.01) | |
| H04L 12/741 | (2013.01) | |
| H04L 12/933 | (2013.01) | |
| H04L 12/937 | (2013.01) | |

(52) U.S. Cl.
CPC ............ *H04L 49/351* (2013.01); *H04L 45/74* (2013.01); *H04L 49/10* (2013.01); *H04L 49/254* (2013.01); *H04L 49/70* (2013.01); *H04L 61/6022* (2013.01)

(58) Field of Classification Search
CPC ..... H04L 49/351; H04L 45/74; H04L 49/254; H04L 49/70; H04L 49/10; H04L 61/6022
See application file for complete search history.

(56) References Cited

U.S. PATENT DOCUMENTS

| | | | |
|---|---|---|---|
| 2005/0190757 A1 | 9/2005 | Sajassi | |
| 2006/0198389 A1 | 9/2006 | Erickson et al. | |
| 2006/0251067 A1* | 11/2006 | DeSanti | H04L 29/12801 370/389 |
| 2011/0188511 A1 | 8/2011 | Benedetto | |
| 2013/0094357 A1* | 4/2013 | Sankar | H04L 45/586 370/230 |
| 2014/0185615 A1 | 7/2014 | Ayoub et al. | |
| 2014/0226531 A1* | 8/2014 | Farkas | H04L 41/0893 370/256 |
| 2014/0269274 A1* | 9/2014 | Banavalikar | H04L 47/39 370/230 |

(Continued)

OTHER PUBLICATIONS

International Search Report and Written Opinion for PCT Patent Application No. PCT/US2017/035048, dated Sep. 8, 2017, 10 pages.

*Primary Examiner* — Jay P Patel
(74) *Attorney, Agent, or Firm* — Compass IP Law PC

(57) ABSTRACT

Examples include techniques for virtual Ethernet switching of a multi-node fabric. In some examples, first Ethernet links coupled with a group of Ethernet gateways are link aggregated. The group of Ethernet gateways couple with respective individual physical switch ports of a fabric switch of a multi-node fabric to form a default logical gateway to provide an uplink between a virtual Ethernet switch and an Ethernet network external to the multi-node fabric. Also, one or more individual Ethernet gateways coupled with respective individual physical switch ports of the fabric switch may be arranged to provide one or more respective downlinks between the virtual Ethernet switch and one or more Ethernet nodes external to the multi-node fabric via respective second Ethernet links coupled with the one or more individual Ethernet gateways.

25 Claims, 11 Drawing Sheets

System 100

(56) References Cited

U.S. PATENT DOCUMENTS

| | | | |
|---|---|---|---|
| 2014/0269415 A1* | 9/2014 | Banavalikar | H04L 12/185 370/254 |
| 2014/0269745 A1* | 9/2014 | Johnson | H04L 45/745 370/401 |
| 2014/0301402 A1* | 10/2014 | Wenig | H04L 49/25 370/401 |
| 2014/0307555 A1* | 10/2014 | DeCusatis | H04L 47/39 370/236 |
| 2015/0103826 A1 | 4/2015 | Davis | |
| 2015/0172070 A1* | 6/2015 | Csaszar | H04L 12/1863 370/218 |
| 2017/0302739 A1* | 10/2017 | Hughes | H04L 65/4076 |

* cited by examiner

900

```
LINK AGGREGATE, BY A CONTROLLER FOR A FIRST vESW OF A MULTI-NODE
FABRIC, FIRST ETHERNET LINKS COUPLED WITH A FIRST GROUP OF ETHERNET
GATEWAYS, THE FIRST GROUP OF ETHERNET GATEWAYS COUPLED WITH
RESPECTIVE INDIVIDUAL PHYSICAL SWITCH PORTS OF A FIRST FABRIC SWITCH
OF THE MULTI-NODE FABRIC TO FORM A FIRST LOGICAL GW TO PROVIDE AN
UPLINK BETWEEN THE FIRST vESW AND AN EXTERNAL ETHERNET NETWORK TO
THE MULTI-NODE FABRIC, THE MULTI-NODE FABRIC TO USE A NON-ETHERNET
COMMUNICATION PROTOCOL TO TRANSMIT FABRIC PACKETS BETWEEN NODES,
THE FIRST vESW TO RECEIVE OR TRANSMIT ETHERNET PACKETS ENCAPSULATED
BY THE NON-ETHERNET COMMUNICATION PROTOCOL USED TO TRANSMIT THE
FABRIC PACKETS
902
```

```
ARRANGE ONE OR MORE FIRST INDIVIDUAL ETHERNET GWs COUPLED WITH
RESPECTIVE INDIVIDUAL PHYSICAL SWITCH PORTS OF THE FIRST FABRIC SWITCH
TO PROVIDE ONE OR MORE RESPECTIVE DOWNLINKS BETWEEN THE FIRST vESW
AND ONE OR MORE FIRST ETHERNET NODES EXTERNAL TO THE MULTI-NODE
FABRIC VIA RESPECTIVE SECOND ETHERNET LINKS COUPLED WITH THE ONE OR
MORE FIRST INDIVIDUAL ETHERNET GWs
904
```

```
LINK AGGREGATE, BY A CONTROLLER FOR A SECOND vESW OF THE MULTI-NODE
FABRIC, THIRD ETHERNET LINKS COUPLED WITH A SECOND GROUP OF
ETHERNET GWS, THE SECOND GROUP OF ETHERNET GATEWAYS COUPLED WITH
RESPECTIVE INDIVIDUAL PHYSICAL SWITCH PORTS OF A SECOND FABRIC
SWITCH OF THE MULTI-NODE FABRIC TO FORM A SECOND DEFAULT LOGICAL
GW TO PROVIDE AN UPLINK BETWEEN THE SECOND vESW AND THE ETHERNET
NETWORK EXTERNAL TO THE MULTI-NODE FABRIC
906
```

```
ARRANGE ONE OR MORE SECOND INDIVIDUAL ETHERNET GWs COUPLED WITH
RESPECTIVE INDIVIDUAL PHYSICAL SWITCH PORTS OF THE SECOND FABRIC
SWITCH TO PROVIDE ONE OR MORE RESPECTIVE DOWNLINKS BETWEEN THE
SECOND vESW AND ONE OR MORE SECOND ETHERNET NODES EXTERNAL TO THE
MULTI-NODE FABRIC VIA RESPECTIVE FOURTH ETHERNET LINKS COUPLED
WITH THE ONE OR MORE SECOND INDIVIDUAL ETHERNET GWs
908
```

*FIG. 9*

Storage Medium *1000*

Computer Executable Instructions for 900

FIG. 10

TECHNIQUES FOR VIRTUAL ETHERNET SWITCHING OF A MULTI-NODE FABRIC

TECHNICAL FIELD

Examples described herein are generally related to virtualized Ethernet communications for a multi-node fabric.

BACKGROUND

Use of a large number of multi-core processors interconnected as compute nodes in a multi-node fabric is gaining in popularity for applications that feature computationally intensive tasks. For example, multi-node fabrics or systems implemented with large numbers of compute nodes physically located relatively near each other, and coupled via high-speed, low latency interconnects may be well suited for applications such as quantum mechanics, weather forecasting, climate research, oil and gas exploration or molecular modeling. These multi-node fabrics or systems may have processing capacity many orders of magnitude greater than that of a single computer. As the number of compute nodes included in some multi-node fabrics increases, a processing capacity (generally rated by floating pointing operations per second (FLOP)) may reach in the petaflops range or higher for these large multi-node fabrics.

BRIEF DESCRIPTION OF THE DRAWINGS

FIG. 9 illustrates an example of a logic flow.
FIG. 10 illustrates an example of a storage medium.

DETAILED DESCRIPTION

As contemplated in the present disclosure, multi-node fabrics or systems may be implemented with large numbers of compute nodes physically located in proximity to each other, and coupled via high-speed, low latency interconnects. In order to maintain high-speed, low latency interconnects, multi-node fabrics or systems may utilize non-standardized and/or proprietary-based communication protocols tailored to maximize speeds and reduce latencies. However, compute nodes included in these multi-node fabrics may have a need to access or communicate with other nodes such as file or storage servers that may communicate using standardized communication protocols such as Ethernet communication protocols. These Ethernet communications protocols may comply with one or more Ethernet standards promulgated by the Institute of Electrical and Electronics Engineers (IEEE). For example, one such Ethernet standard promulgated by IEEE may include IEEE 802.3-2012, Carrier sense Multiple access with Collision Detection (CSMA/CD) Access Method and Physical Layer Specifications, Published in December 2012 (hereinafter "IEEE 802.3").

In some examples, a multi-node fabric may configure one or more nodes to function as a type of virtual Ethernet switch (vESW) to facilitate layer-2 tunneling of Ethernet packets received from an Ethernet network that is external to the multi-node fabric. For these examples, an Ethernet gateway may include an interface via which Ethernet packets routed through the vESW may be placed on physical Ethernet links to form an uplink with the external Ethernet network. In this regard, the whole multi-node fabric may be a single leaf in an Ethernet topology with the external Ethernet network. As a single leaf, available bandwidth as well as failover capabilities for maintaining communication with the Ethernet network may be limited. It is with respect to these challenges that the examples described herein are needed.

Figure 1:
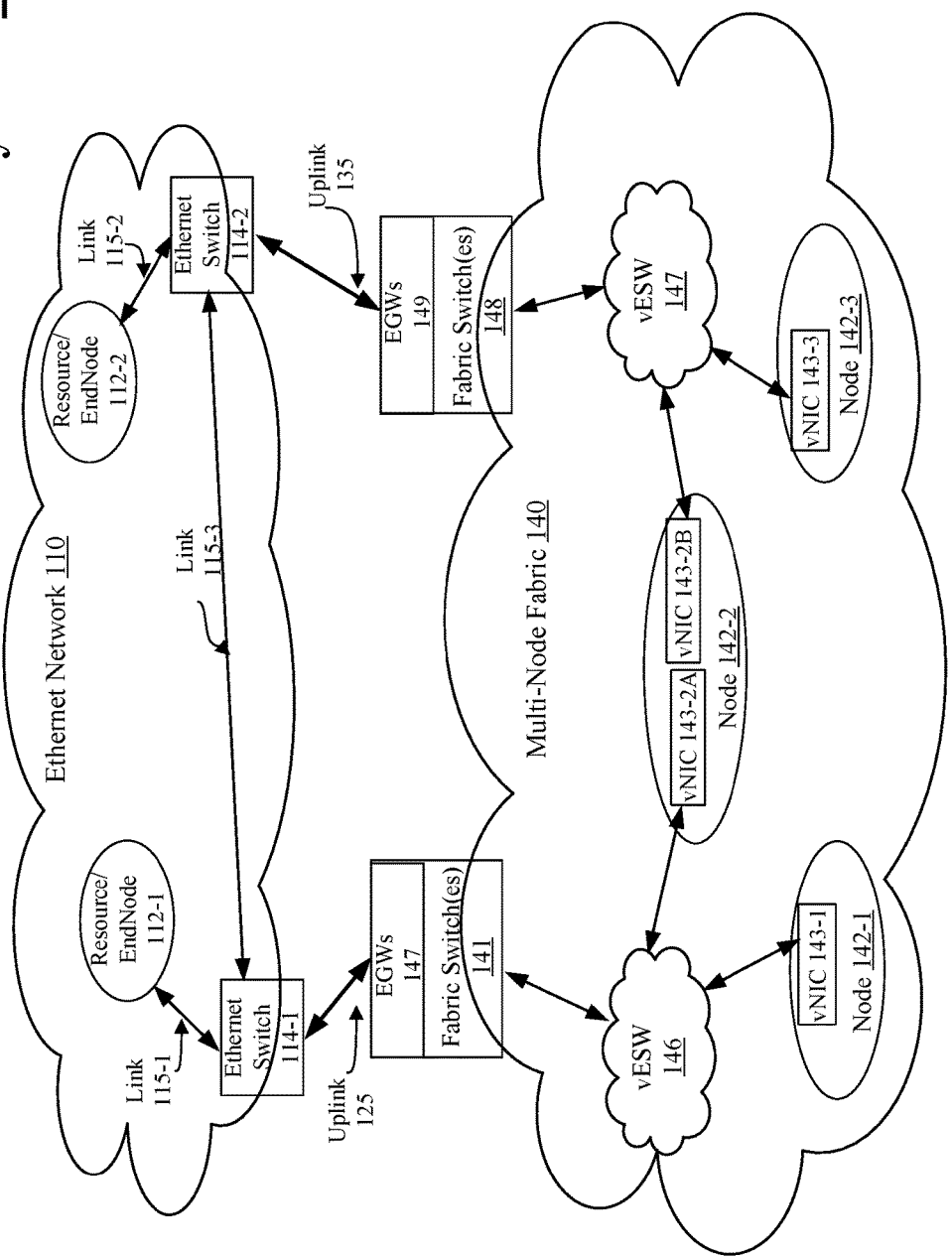
FIG. 1 illustrates an example first system.

FIG. 1 illustrates an example system 100. In some examples, as shown in FIG. 1, system 100 includes an Ethernet network 110 and a multi-node fabric 140 coupled via respective uplinks 125 and 135. Also as shown in FIG. 1, a small example portion of resources/end nodes included in Ethernet network 110 are shown as resources/EndNodes 112-1 and 112-2 coupled with Ethernet switches 114-1 and 114-2 via respective links 115-1 and 115-2. A small example portion of nodes included in multi-node fabric 140 is also shown in FIG. 1 as nodes 142-1 and 142-2 communicatively coupled with virtual Ethernet switch (vESW) 146 via respective virtual network interface cards (vNICs) 143-1 and 143-2*a* and nodes 142-2 and 142-3 communicatively coupled with vESW 147 via respective vNICs 143-2B and vNIC 143-3. The example portions of Ethernet network 110 and multi-node fabric 140 may represent a small number of resources/end nodes and/or fabric nodes. For example, multi-node fabric 140 may include possibly fifty thousand, one hundred thousand, millions or even more of interconnect nodes. Ethernet network 110 may also include substantially more resources/end nodes than the two shown in FIG. 1. As substantially more nodes may exist in multi-node fabric 140 than what is shown in FIG. 1, a substantially larger number of vESWs may also be included in multi-node fabric 140 to facilitate layer-2 tunneling of Ethernet packets through multi-node fabric 140. Therefore, this disclosure is not limited to example multi-node fabrics having two vESWs.

According to some examples, nodes 142-1, 142-2 or 142-3 may be capable of utilizing non-standardized and/or proprietary-based communication protocols to communicate within multi-node fabric 140. For example, nodes 142-1, 142-2 or 142-3 may be capable of operating according to such non-standardized and/or proprietary-based communication protocols such as, but not limited to, Intel® Corporation's Storm Lake (STL) Fabric Technology using the Intel® Omni-Path architecture (Intel® OPA), herein referred to as "the Omni-Patch architecture or model".

In some examples, the Omni-Path architecture or model may include two layers of packets. These two layers of packets may manifest as an in-between layer of the Omni-Path model (e.g., between layer-1 and layer-2 protocols). For the Omni-Path model, the closest thing to traditional packets is a packet called a fabric packet (FP). The FP may be arranged as a node-to-node packet type that may be generated by higher levels of a protocol stack. However FPs may not be transmitted as-is, and may instead be broken down into another type of packet referred to as link transfer packet (LTP). An LTP may be arranged as a smaller link-local packet relative to an FP. In some examples, the LTP may be referred to as a kind of layer 1.5 packet. It may be at this level that retransmission of packets occurs if bit-errors are detected for transmitted packets.

According to some examples, LTPs may have a packet format that is 1056 bits in length and may include a combination of data (1024 bits), flow control digit (FLIT) type bits (16 bits, 1 for each FLIT), cyclic redundancy check (CRC) information (14 bits), and virtual lane credit bits (2 bits). For these examples, for the data included in an LTP, the 1024 data bits may be split up into 16×64-bit FLITs. These 16×64-bit FLITs may be separately arranged as a smallest unit of data. An LTP may contain FLITs from multiple FPs. Thus the 16×64-bit FLITs included in the data portion of an LTP may be a way for data from multiple FPs within a single LTP to be kept organized.

In some examples, having an LTP that is 1056 bits in size and includes 1024 bits of data may give the LTP an efficiency equivalent to 64/66b encoding, similar to other types of fabric standards (e.g., InfiniBand). A bit-scrambler may be used in order to provide protection against running disparity without having to use further encoding and padding on top of the LTP. According to some examples, the Omni-Path link layer may be over-clocked such that it runs at 25.78125 Gbps, which after the overhead of the LTP may give nodes operating in compliance with the Omni-Path model 100 Gb/sec of bandwidth at the link layer level for links between nodes.

According some examples, error detection and transmission under the Omni-Path model may be enabled by LTPs having their own 14-bit CRC. For these examples, having their own 14-bit CRC may mean that a link operating in accordance with the Omni-Path model may request a retransmission should an LTP become corrupt, catching it after just 1056 bits and before an LTP moves on to the next link in a route through a multi-node fabric. Meanwhile, in an unlikely event that an error still makes it through, then an FP error check at a destination node may find the error and trigger a retransmission of the whole FP.

In some examples, the Omni-Path model may include traffic flow optimization to allow for packet prioritization. For these examples, because LTPs may be composed of data from multiple FPs via the use of FLITs, the Omni-Path model may have a relatively simple method to handle packet prioritization. For example, higher priority FPs may be given space on a current LTP, bumping a lower priority FP already in progress, and the lower priority FP may complete whenever it is not being blocked by higher priority traffic. This may improve packet latencies as higher priority packets may have a minimal wait time (a 16-bit FLIT) before being able to assume control of a link between nodes. According to some examples, the Omni-Path model may support up to, but not limited to, 32 priority levels.

According to some examples, nodes 142-1, 142-2 or 142-3 may be capable of operating according to the Omni-Path architecture or model. For these examples, nodes 142-1, 142-2 or 142-3 may each include one or more vNICs in order to receive and transmit fabric encapsulated Ethernet packets. In some examples, fabric encapsulated Ethernet packets may include STL-encapsulated Ethernet packets. STL-encapsulated Ethernet packets may mean Ethernet packets encapsulated by fabric packets for a multi-node fabric 140 arranged to operate using a non-standardized or proprietary-based communication protocol such as the Omni-Path architecture or model. For these examples, Ethernet packets included in fabric encapsulated Ethernet packets may be received into multi-node fabric 140 via uplink 125 or 135. As shown in FIG. 1, fabric switch(es) 141 and 148 include respective Ethernet gateways (EGWs) 147 and 149. As described in more detail below, EGWs may include logic and/or features to receive Ethernet packets from an external Ethernet network or node via Ethernet links coupled with these EGWs and then fabric encapsulate these received Ethernet packets for transport through a multi-node fabric such as multi-node fabric 140. In some examples, vNICs 143-1, 143-2A, 143-2B and 143-3 communicatively coupled with vESW 146 or vESW 147 may enable nodes 142-1, 142-2 or 142-3 to receive and transmit fabric encapsulated Ethernet packets within multi-node fabric 140 and thus implement layer-2 tunneling of Ethernet packets received from Ethernet network 110.

As described in more detail below, in some examples, an uplink between a multi-node fabric and an external Ethernet network may include multiple Ethernet links coupled with multiple EGWs to form a single logical gateway to provide the uplink. The uplink coupled EGWs, as described more below, may be referred to as a vESW's default gateway. According to some examples, uplink 125 between a multi-node fabric 140 and Ethernet network 110 may include multiple Ethernet links coupled through EGWs 147 to form a single logical gateway to provide uplink 125. The multiple Ethernet links coupled with multiple EGWs may be link aggregated to form the single logical gateway. The single logical gateway composed of multiple gateways with link aggregation may boost or increase data bandwidth of a given vESW by increasing a number of ports via which Ethernet packets to/from multi-node fabric 140 may be routed over physical Ethernet links with Ethernet network 110. Also, link aggregation for Ethernet links coupled with EGWs 147 may increase a stability of uplink 125 if one or more Ethernet links are broken or become inoperable. For example, a first EGW included in EGWs 147 may be configured to accept fabric encapsulated Ethernet traffic or packets that would otherwise be bound for a second EGW included in EGWs 147 if the second EGW or the Ethernet links coupled with the second EGW were to fail.

EGWs 147 or 149 may be separately incorporated in one or more multi-node fabric switches included in respective fabric switch(es) 141 or 148. In some other examples, EGWs 147 or 149 may be stand-alone Ethernet gateway devices coupled with multi-node fabric switches. EGWs 147 or 149 may be effectively end-points of multi-node fabric 140 and may be responsible for forwarding Ethernet packets between external Ethernet network 110 and multi-node fabric 140. An EGW included in EGWs 147 or 149, as mentioned above, may be configured with other EGWs to provide a default uplink for a vESW, such as vESW 146 or 147 to Ethernet network 110. One or more other EGWs may also be included in EGWs 147 and/or 149. These other EGWs, as described more below, may be used to connect with an Ethernet-enabled end node to form a downlink between a multi-node fabric and the Ethernet-enabled end node. In other examples, the other EGWs may be capable of forming downlinks between the multi-node fabric and individual Ethernet nodes, Ethernet switches or routers (e.g., layer-3 routers).

In some examples, vNICs for nodes of multi-node fabric 140 may be assigned to transmit or receive Ethernet packets through a given vESW coupled with one or more fabric switches having EGWs to reach Ethernet network 110. For example, the vNICs may be assigned a virtual Ethernet switch identifier (vESWID) to indicate which vESW to use to route Ethernet packets to reach Ethernet network 110 through the one or more fabric switches having EGWs configured as members of a vESW's default EGW. For example, vNIC 143-1 at node 142-1 and vNIC 143-2A at node 142-2 may be assigned a vESWID that identifies vESW 146 as the vESW to use to reach Ethernet network 110 through default EGWs comprised of EGWs 146. Also, vNIC 143-2B at node 142-2 and vNIC 143-3 at node 142-3 may be assigned a vESWID that identifies vESW 147 as the vESW to use to reach Ethernet network 110 through default EGWs comprised of EGWs 147.

In some examples, even though a first vNIC at a first node may be assigned to a first vESW for use to reach Ethernet network 110 and a second vNIC at a second node may be assigned a second vESW to reach Ethernet network 110, the first and second vNICs may still be able to conduct layer-2 tunneling of Ethernet packets between nodes hosting the first and second vNICs through the different vESWs. For example, if vESW 147 were to fail, vNIC 143-3 at dual port node 142-3 and vNIC 143-2B at node 142-2 may be first logically removed from membership with vESW 147 and then added to a membership with vESW 146. As a result of the new membership to vESW 146 these vNICs may be reassigned to have a vESWID for vESW 146 to enable these vNICs to still conduct layer-2 tunneling.

According to some examples, multiple vESWs coupling nodes of multi-node fabric 140 to multiple fabric switches having multiple EGWs to route Ethernet packets to/from Ethernet network 110 may also provide failover capabilities for these nodes to couple to resources/end nodes of Ethernet network 110. For example, if a substantial number or all of the Ethernet links coupled with EGWs 149 may fail, malfunction or become inoperable, vNICs 143-3 and 143-2B having a membership with vESW 147 may be first logically removed from membership with vESW 147 and then added to a membership with vESW 146. As a result of the new membership to vESW 146 these vNICs may be reassigned the vESWID for vESW 146 in order to maintain Ethernet communications with Ethernet Network 110 through Ethernet links coupled with EGWs 147.

In some examples, high performance computing (HPC) applications may be implemented across inter-connected nodes such as nodes 142-1 to 142-3 included in multi-node fabric 140. These inter-connected nodes may include compute nodes forming a so-called "fabric" or "multi-node fabric" in which each node may be communicatively coupled with every other node via a network. In some examples, inter-node communication may occur during performance of an HPC application that may utilize communication protocols such as Intel® Corporation's STL Fabric Technology using Intel® OPA. Inter-node communication may include a source node in the multi-node fabric sending a sequence of packets to a destination or target node in the multi-node fabric. The sequence of packets may be associated with, for example, gets or sets which seek to read or write to memory associated with the destination or target node. Each packet may have a light-weight, fabric-routable format designed to allow efficient layer-2 switching from the source node to the destination or target node.

According to some examples, interconnected nodes included in multi-node fabric 140 may be capable of conducting layer-2 tunneling of Ethernet packets received from Ethernet network 110 in order to communicate with resources/EndNodes 112-1 and 112-2 to facilitate implementation of HPC applications across inter-connected nodes. For example, resources/EndNodes 112-1 or 112-2 may include resources that may not be capable of communicating via a communication protocol such as Intel® Corporation's STL Fabric Technology using Intel® OPA but may be able to communicate via Ethernet communication protocols such as those described by IEEE 802.3. These resources may include, but are not limited to one or more file servers or storage servers that may maintain information needed by at least some nodes of multi-node fabric 140 in order to implement at least some HPC applications.

While specific references are made to HPC applications, this disclosure is not intended to be limited to HPC applications. For example, nodes of a multi-node fabric such as those included in multi-node fabric 140 may include standard computer systems, such as server computers commercially available for non-HPC applications (e.g., data storage, email servers, domain controllers, etc.). Thus, a multi-node fabric is not limited to a so-called "super computer" configured with ultra-high performance computing nodes. In addition, both general-purpose data center applications and specific-purpose data center applications are within the scope of this disclosure. For example, general-purpose data centers may generally include infrastructure that supports a single business with a broad variety of applications, or an information technology (IT) service provider servicing many customers. On the other hand, specific-purpose data centers may generally include university and military research, scientific laboratories, financial institutions, and search engine providers, just to name a few. Specific-purpose data centers may generally implement specific usage patterns and may be well suited for highly-scalable architecture that may be tailored for a single or otherwise limited number of purposes. Also, this disclosure may have applicability to commercial and custom solutions for cloud computing or shared/distributed infrastructure including, but not limited to, software as a service (SaaS), infrastructure as a service (IaaS) or platform as a service (PaaS). In any such cases, the techniques for virtual Ethernet switching and link aggregation of Ethernet links routed through multiple EGWs may be equally applicable to both general-purpose and specific-purpose data center applications. Also, as generally referred to herein, the term "fabric-routable" may refer to a packet that may be routed end-to-end via a multi-node fabric, using, for example, networking equipment (e.g., switches, routers, etc.) configured to perform layer-2 switching.

Figure 2:
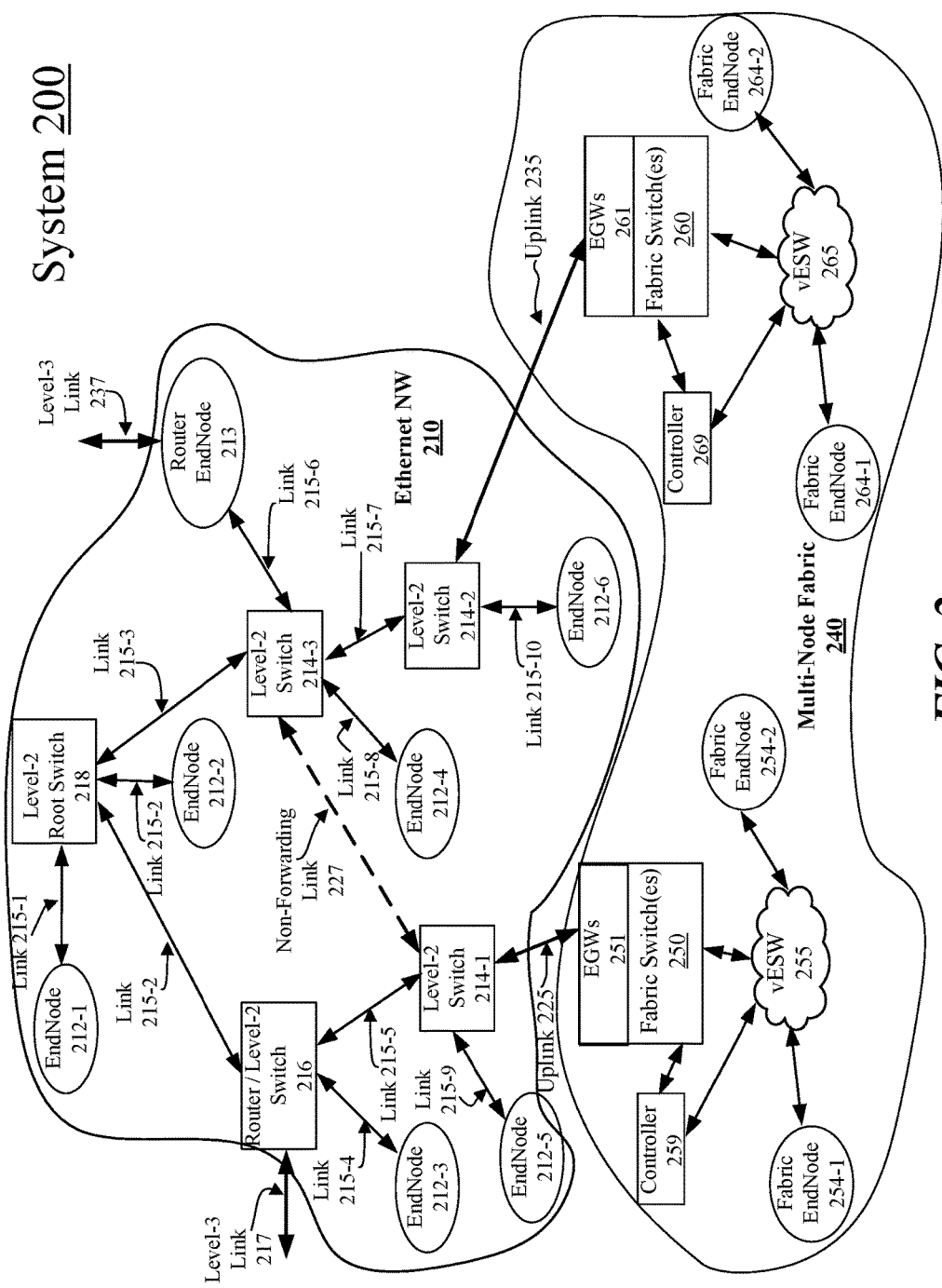
FIG. 2 illustrates an example second system.

FIG. 2 illustrates example system 200. In some examples, system 200 shows an example Ethernet topology having at least two independent leafs for a multi-node fabric 240 in relation to the example Ethernet topology. For these examples, the first leaf for multi-node fabric 240 may couple with an external Ethernet network 210 via an uplink 225 and the second leaf for multi-node fabric 240 may couple with external Ethernet network 210 via an uplink 235.

In some examples, the Ethernet topology shown in FIG. 2 may be for Ethernet network 210 and may include a single connected layer-2 network. For these examples, Ethernet network 210 may include layer-2 switches 214-1, 214-2 and 214-3 as well as router/layer-2 switch 216 and layer-2 root switch 218 to forward and/or route Ethernet packets via links 215-1 to 215-10 to/from EndNodes 212-1 to 212-6. Also, router/layer-2 switch 216 and router EndNode 213 may be capable of routing Ethernet packets outside of Ethernet network 210 via respective layer-3 links 217 and 237. Also, a non-forwarding link 227 may represent a section of a path via which nodes of multi-node fabric 240 having vNICs assigned to different vESWs may route non-forwarding Ethernet packets. In other words, unicast Ethernet packets may be routed via non-forwarding link 227 but in order to prevent looping, multi-cast Ethernet packets may be non-forwarding Ethernet packets.

According to some examples, one or more fabric switch(es) 250 and 260 may include respective EGWs 251 and 261 as shown in FIG. 2. For these examples, EGWs 251 and 261 may each represent a default EGW for respective vESWs 255 and 265. Similar to EGWs 147 and 149 described above for FIG. 1, EGWs 251 and 261 may include logic and/or features to receive Ethernet packets from Ethernet network 210 via Ethernet links and then fabric encapsulate these received Ethernet packets for transport through a multi-node fabric such as multi-node fabric 240. The Ethernet links coupled with multiple EGWs included in EGWs 251 or 261 may be link aggregated to form logical gateways to provide respective uplinks 225 and 235 between Ethernet network 210 and multi-node fabric 240.

In some examples, respective controllers 259 and 269 shown in FIG. 2 as coupling with vESWs 255 and 265 or fabric switch(es) 250 or 260 may include logic and/or features capable of configuring or arranging EGWs for these fabric switches. For example, controller 259 may include logic and/or features to link aggregate first Ethernet links coupled through EGWs included in EGWs 251 to couple with Ethernet network 240 to form a single logical gateway to provide uplink 225.

According to some examples, controllers 259 and 269 may be separate controllers supported or hosted by same or separate nodes included in multi-node fabric 240. Controllers 259 and 269 may also be referred to as Ethernet virtual switch managers or Ethernet managers. For these examples, separate controllers 259 and 269 may be arranged to support a distributed and fabric management service to manage or control vESWs 255 or 265, fabric switch(es) 250 or 260, and EGWs 251 or 261.

In some examples, controllers 259 and 269 may be composed of circuitry supported or hosted by a same node included in multi-node fabric 240. For these examples, the same node may be arranged or configured to support a centralized fabric management service to manage or control vESWs 255 or 265, fabric switch(es) 250 or 260, and EGWs 251 or 261.

Figure 3:
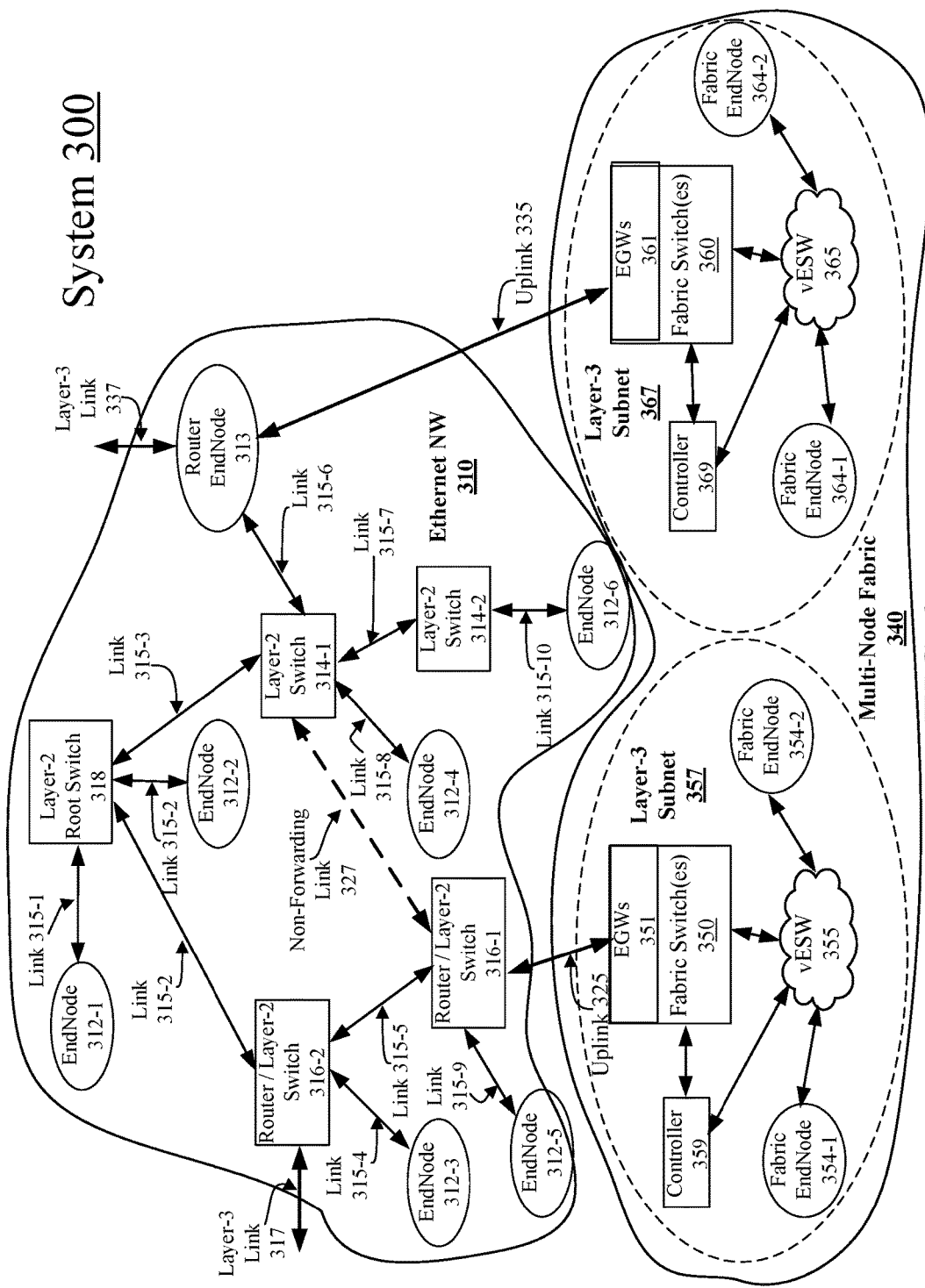
FIG. 3 illustrates an example third system.

FIG. 3 illustrates an example system 300. In some examples, system 300 is similar to system 200 and shows an example Ethernet topology having two independent leafs for a multi-node fabric 340 in relation to the example Ethernet topology. For these examples, the first leaf for multi-node fabric 340 may couple with an external Ethernet network 310 via an uplink 325 and the second leaf for multi-node fabric 340 may couple with external Ethernet network 310 via an uplink 335.

In some examples, the two different leafs of the Ethernet topology shown in FIG. 3 depict different layer-3 subnets 357 and 367. For these examples, rather than connect via layer-2 Ethernet switches, EGWs 351 of fabric switch(es) 350 couples with a router/layer-2 switch 316-1 via uplink 325 and EGWs 361 of fabric switch(es) 360 couples with router EndNode 313 via uplink 335. For these examples, bypass unicast forwarding may not be configured as enabled between vESW 355 and vESW 365. Other than not enabling bypass unicast forwarding, the elements of system 300 may be arranged to function in a similar manner as described above for system 200 in FIG. 2.

Figure 4:
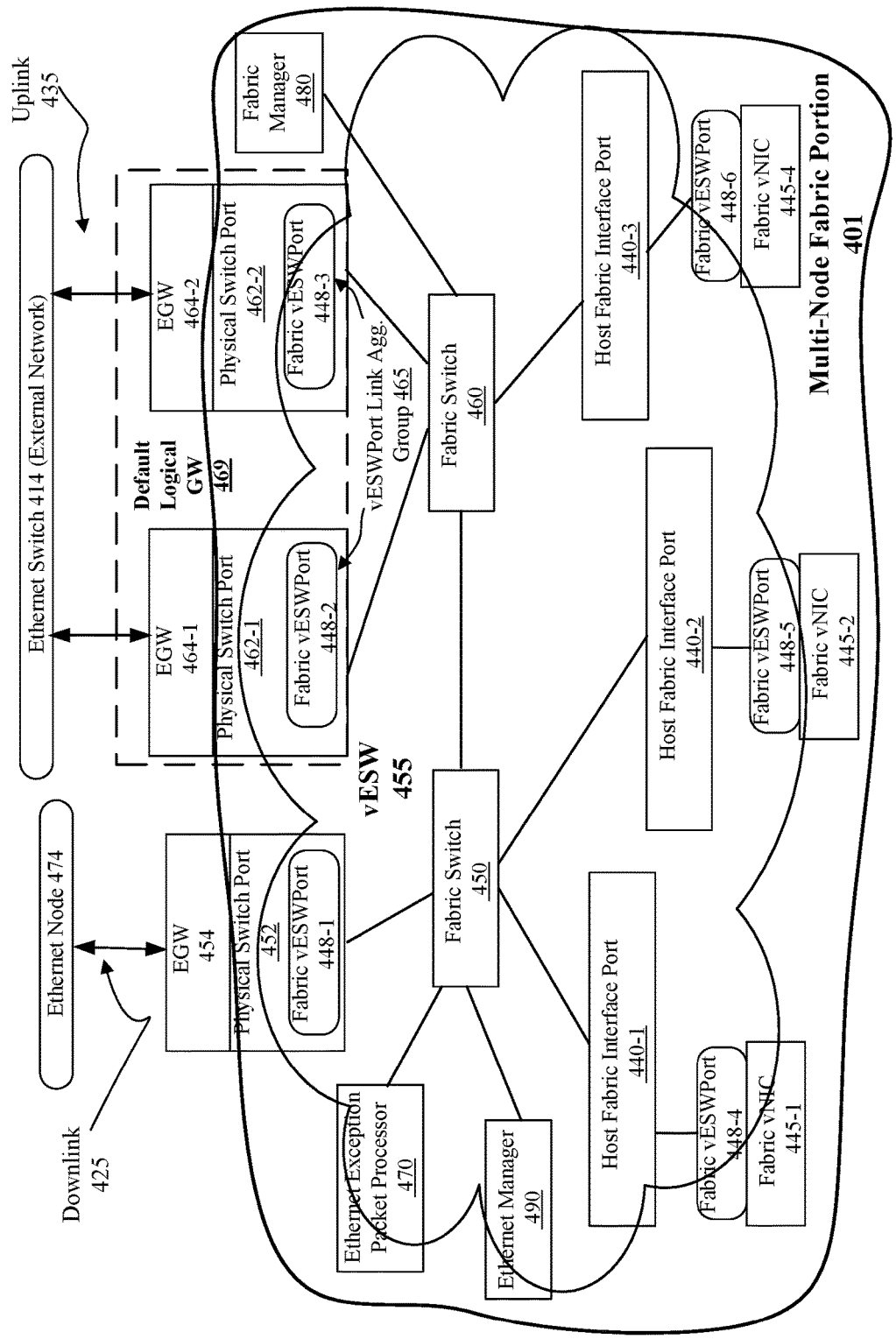
FIG. 4 illustrates an example fourth system.

FIG. 4 illustrates an example system 400. In some examples, system 400 depicts architectural components associated with a nodes of a multi-node fabric portion 401 arranged to route Ethernet packets between nodes in multi-node fabric portion 401 and to route Ethernet packets to either Ethernet node 474 or Ethernet switch 414 (external network) coupled with multi-node fabric portion 401. As shown in FIG. 4, system 400 includes host fabric interface ports 440-1, 440-2 and 440-3 coupled with fabric vNICs 445-1, 445-2 and 445-4 via respective fabric virtual Ethernet switch ports (vESWPorts) 448-4, 448-5 and 448-6. Host fabric interface ports 440-1 and 440-2 may be coupled with fabric switch 450 and host fabric interface port 440-3 may couple with fabric switch 460. Also, as shown in FIG. 4, fabric switch 450 may include a physical switch port 452 having a fabric vESWPort 448-1 and fabric switch 460 may include physical switch ports 462-1 and 462-2 having respective fabric vESWPorts 448-2 and 448-3.

According to some examples, the various above-mentioned fabric vESWPorts may represent internal switching of Ethernet packets routed within multi-node fabric portion 401 to implement vESW 455. Similar to the vESWs shown in FIGS. 1-3, vESW 455 may couple with fabric switches having EGWs to couple to either Ethernet node 474 via downlink 425 or Ethernet switch 414 via uplink 435 to facilitate layer-2 tunneling of Ethernet packets to/from Ethernet node 474 or Ethernet switch 414. As shown in FIG. 4, vESW 455 may be implemented via use of one or more fabric switches such as fabric switches 450 or 460. These fabric switches may be hosted by multiple separate nodes or may be hosted by a single node of multi-node fabric portion 401.

In some examples, as shown in FIG. 4, EGWs 464-1 and 464-2 may be coupled with respective physical switch ports 462-1 and 462-2 of fabric switch 460 and may be link aggregated to from a default logical gateway (GW) 469 to provide uplink 435 with Ethernet switch 414. Also, as shown in FIG. 4, fabric vESWPorts 448-2 and 448-3 may be aggregated to form a vESWPort link aggregation group 465. For these examples, default logical GW 469 may couple with vESW 455 through vESWPort link aggregation group 465 via which Ethernet packets may be routed through default logical GW 469 to/from nodes included in multi-node fabric portion 401. Also, as shown in FIG. 4, an EGW 454 of fabric switch 450 (e.g., a non-default EGW) may have a fabric vESWPort 448-1 coupled with vESW 455 via which Ethernet packets may be routed over downlink 425 and through EGW 454 to/from nodes included in multi-node fabric portion 401.

According to some examples, a vESW such as vESW 455 may provide a mechanism which allows a multi-node fabric to integrate with an external Ethernet or external Ethernet networks as one of possibly multiple leaves of the external topology rather than as a single leaf and with independent EGW bandwidth for each of the leaves. The mechanism may be similar to a virtual local access network (VLAN), but it is a native fabric mechanism. This mechanism does not perturb VLAN tag configuration in the external Ethernet.

In some examples, interfaces for transmitting or receiving fabric-encapsulated Ethernet packets such as those included in fabric vNICs 445-1, 445-2 or 445-4, or included in physical switch ports 452, 462-1 or 462-2 may be assigned a vESWID. For these examples, interfaces with a same assigned vESWID may directly exchange multi-node fabric exchange fabric-encapsulated Ethernet packets via use of fabric multicast local identifiers (LIDs). In order to exchange multicast or flooded Ethernet packets between interfaces with different assigned vESWIDs (e.g., fabric vNICs coupled with other vESWs), the exchange needs to occur through EGWs and external Ethernet switches. For example, through default logical GW 469 and Ethernet switch 414.

According to some examples, fabric vESWPorts 448-1 to 448-6 may be logically an implementation of packet switching within vESW 455. Fabric vESWPorts 448-1 to 448-6 may be responsible for performing fabric encapsulation and de-encapsulation of Ethernet packets so that they might transit at least multi-node fabric portion 401. Fabric vESWPorts 448-1 to 448-6 may exist between fabric vNICs or EGWs at fabric switches. In some examples, vESWPorts 448-1 to 448-6 may be configured or managed by Ethernet manager 490 coupled with vESW 455 via fabric switch 450.

In some examples, fabric vNICs 445-1, 445-2 or 445-4 may be internal end-node interfaces to receive and transmit fabric-encapsulated Ethernet packets. A single fabric vNIC interface may pass Ethernet packets to and from multi-node fabric portion 401 through its corresponding fabric vESWPort. Coordination of configured state between fabric management (e.g., fabric manager 480 and/or Ethernet manager 490) and the fabric vNIC state may be accomplished via the corresponding fabric vESWPort. According to some examples, a fabric vNIC may not be directly managed by Ethernet manager 460 but may be indirectly managed via it fabric vESWPort.

According to some examples, host fabric interface ports 440-1 to 440-3 may provide a physical access to multi-node fabric portion 401 for fabric vESWPorts 448-4, 448-5 or 448-6. These multiple fabric vESWPorts may be distinguished by their configured or assigned vESWIDs.

In some examples, fabric switches such as fabric switches 450 or 460 may be arranged to forward fabric packets through multi-node fabric portion 401. Fabric switches 450 or 460 may not pass any Ethernet packet information or any information in an Ethernet specific fabric encapsulation. Multi-node fabric portion 401 may provide for distribution of multiple flows across different routing paths through multi-node fabric portion 401 using, for example, an Entropy field of a layer-2 fabric header.

According to some examples, EGWs such as EGWs 464-1 or 464-2 as well as EGW 454 may be architecturally optimized to be incorporated into a fabric switch. Alternatively, these EGWs may also fit an architectural model for a stand-alone EGW device coupled with a physical switch port. An EGW may be effectively an end-point of a multi-node fabric. In some examples, there may be an explicit fabric link for a stand-alone EGW device and an implicit fabric link between a fabric switch and an EGW for an EGW integrated within a fabric switch. An EGW may be responsible for forwarding Ethernet packets between an external physical Ethernet and the multi-node fabric. Although a management agent for a given EGW may exist as an Ethernet or fabric end-node, the actual EGW may not exist as a final end-node destination on either the multi-node fabric side of the EGW or the external Ethernet side of the EGW. The given EGW has a single fabric vESWport to the multi-node fabric and another single port to the external Ethernet.

In some examples, EGWs 464-1 and 464-2 may functionally act as default uplinks for multi-node fabric portion 401 to Ethernet switch 414. As shown in FIG. 4, default logical GW 469 may include a grouping of fabric vESWPorts 448-2 and 448-3 to form a vESWPort link aggregation group 465. Default logical GW 469 may be responsible for distributing flows across an array of physical gateways via vESWPort link aggregation group 465 coupled with vESW 455. Also, EGW 454 may functionally act as a downlink for multi-node fabric portion 401 to Ethernet node 474.

According to some examples, a fabric switch may be implemented with multiple EGWS, each EGW connected to a different port of the fabric switch. For these examples, each EGW in the fabric switch may exist as an independent entity managed by a common switch management agent.

In some examples, Ethernet manager 490 may be responsible for configuring fabric vNICs 445-1, 445-2 or 445-4, EGW 454 and EGWs 464-1 and 464-2. For these examples, all Ethernet MAC addresses assigned to fabric vNICs 445-1, 445-2 or 445-4, EGW 454 and EGWs 464-1 and 464-2 may be registered with Ethernet manager 490. Assignments of vESWIDs to fabric vNICs and EGWs may also be managed by Ethernet manager 490. Ethernet manager 490 may rely on fabric manager 480 for fabric information that is not Ethernet specific.

According to some examples, EGWs such as EGW 454 and EGWs 464-1 and 464-2 may incorporate a capability to identify "exception" packets and forward them to an Ethernet exception packet processor 470 (e.g., using fabric layer-4 encapsulation other than Ethernet layer-4). For these examples, Ethernet exception packet processor 470 may have access to fabric layer-2 and layer-4 encapsulation of the exception packet so that it may identify the EGW and vESW that sent the exception packet. Ethernet exception packet processor 470 may provide a mechanism for implementation of control plane packet processing for vESW 455. Any packet that would otherwise be dropped may be forwarded to Ethernet exception packet processor 470 for remedial configuration updates to vESW 455.

Figure 5:
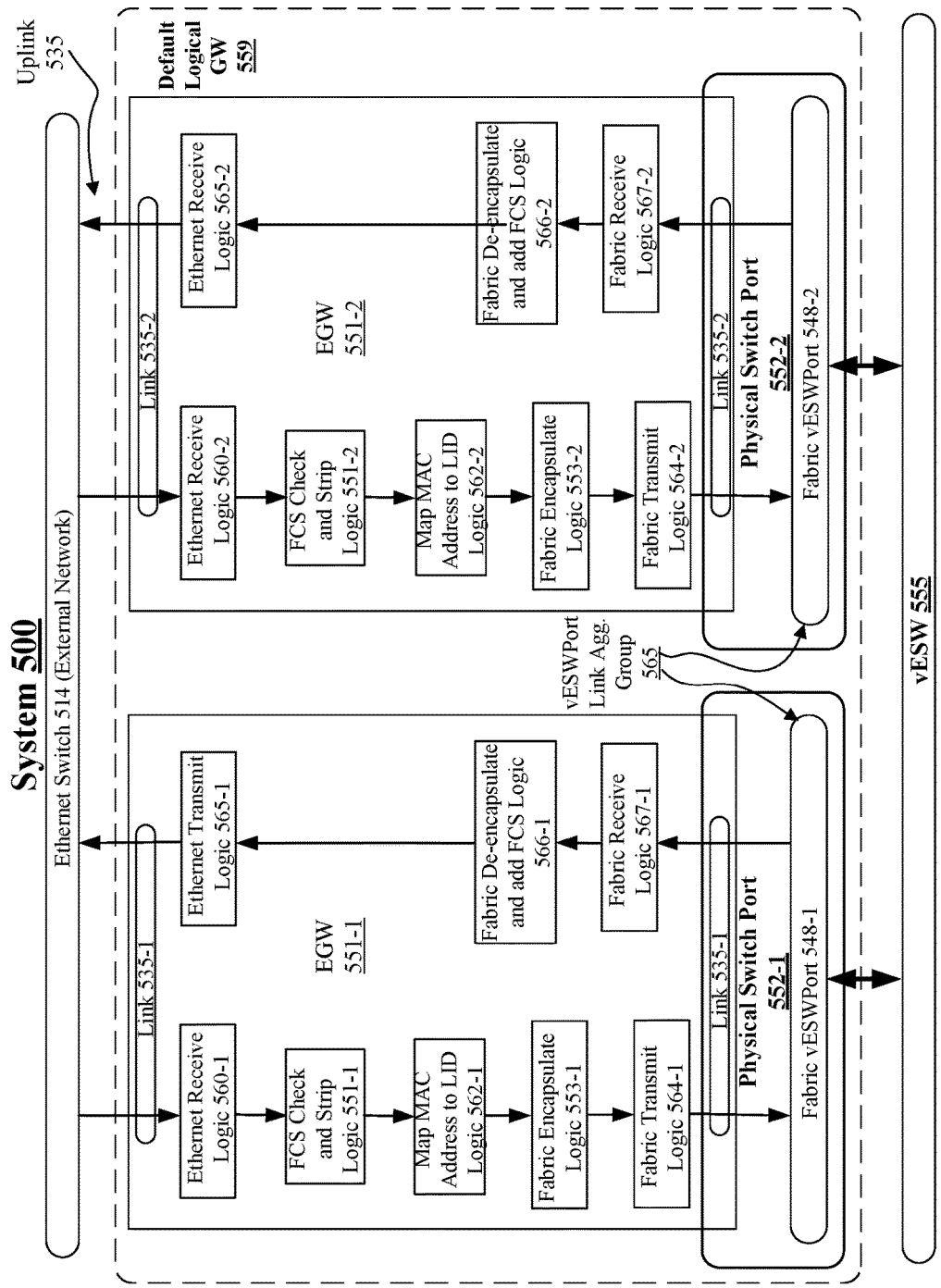
FIG. 5 illustrates an example fifth system.

FIG. 5 illustrates an example system 500. In some examples, system 500 may represent a default logical GW 559 coupled between an Ethernet switch 514 that may be part of an Ethernet network external to vESW 555 for a multi-node fabric. As shown in FIG. 5, EGWs 551-1 and 552-2 may be link aggregated to form a single default logical GW 559 to provide uplink 535 between vESW 555 and Ethernet switch 514. Also, as shown in FIG. 5, the EGWs 551-1 and 551-2 couple with physical switch ports 552-1 and 552-2 that may be part of a fabric switch (not shown). Physical switch ports 552-1 and 552-2 may include respective fabric vESWPorts 548-1 and 548-2 that separately couple with vESW 555 and form vESWPort link aggregation group 565. This disclosure is not limited to link aggregation for two EGWs, any number of EGWs may combined to form a single default logical GW.

According to some examples, EGWs 551-1 and 551-2 may be physical gateways, each routing respective links 535-1 and 535-2 through physical switch port 552-1 and 552-2 to connect to Ethernet switch 514. These links may couple with Ethernet switch 514 as a single aggregated logical link included in uplink 535. For these examples, Ethernet switch 514 may be configured to consider the aggregation of links 535-1 and 535-2 to be a single logical link. Also, from a perspective of vESW 555, link aggregation control protocols may need to be implemented using Ethernet exception packet processing. In some examples, Ethernet switch 514 may include logic and/or features responsible for distribution of traffic routed via uplink 535 and through either EGW 551-1 or EGW 551-2. An example supported mode of link aggregation from a perspective Ethernet switch 514 may be that in which network flows may always map to a same Ethernet link of a given EGW included in default logical GW 559 so that packet order within each network flow and through EGWs in default logical GW 559 may be maintained. Also, logic and/or features at vESW 555 that may forward traffic from a multi-node fabric through EGWs in default logical GW 559 may be responsible for distributing each network flow across EGWs 551-1 and 551-2.

In some examples, for a fabric encapsulated Ethernet packet coming from a multi-node fabric, the fabric encapsulated Ethernet packet may be routed through link 535-1 of EGW 561-1 and received by fabric receive logic 567-1. For these examples, fabric de-encapsulate and add frame check sequence (FCS) logic 566-1 may de-encapsulate the fabric encapsulated Ethernet packet and add an Ethernet FCS.

Ethernet logic transmit logic 565-1 may then transmit the Ethernet packet through link 535-1 that has been link aggregated with link 565-2 to provide uplink 535.

According to some examples, for an Ethernet packet entering the multi-node fabric, the Ethernet packet may also be routed through link 535-1 and received by Ethernet receive logic 560-1. For these examples, FCS check and strip logic 561-1 may check the Ethernet packet for errors and then strip the FCS from the Ethernet packet. Map media access control (MAC) address to local identifier (LID) logic 562-1 may determine what MAC address has been assigned or mapped to a given vNIC at a node in the multi-node fabric based on MAC address information included in the Ethernet packet. In some examples, the mapping may be algorithmic for a locally administered MAC address or the mapping may require a forwarding table lookup. The Ethernet packet may then be encapsulated with fabric information (e.g., STL layer-2 and layer-4 information) by fabric encapsulate logic 563-1. The encapsulated Ethernet packet may then be transmitted by fabric transmit logic 565-1 into the multi-node fabric via link 535-1 to vESWPort 548-1 and then to the identified and mapped MAC address through vESW 555.

Figure 6:
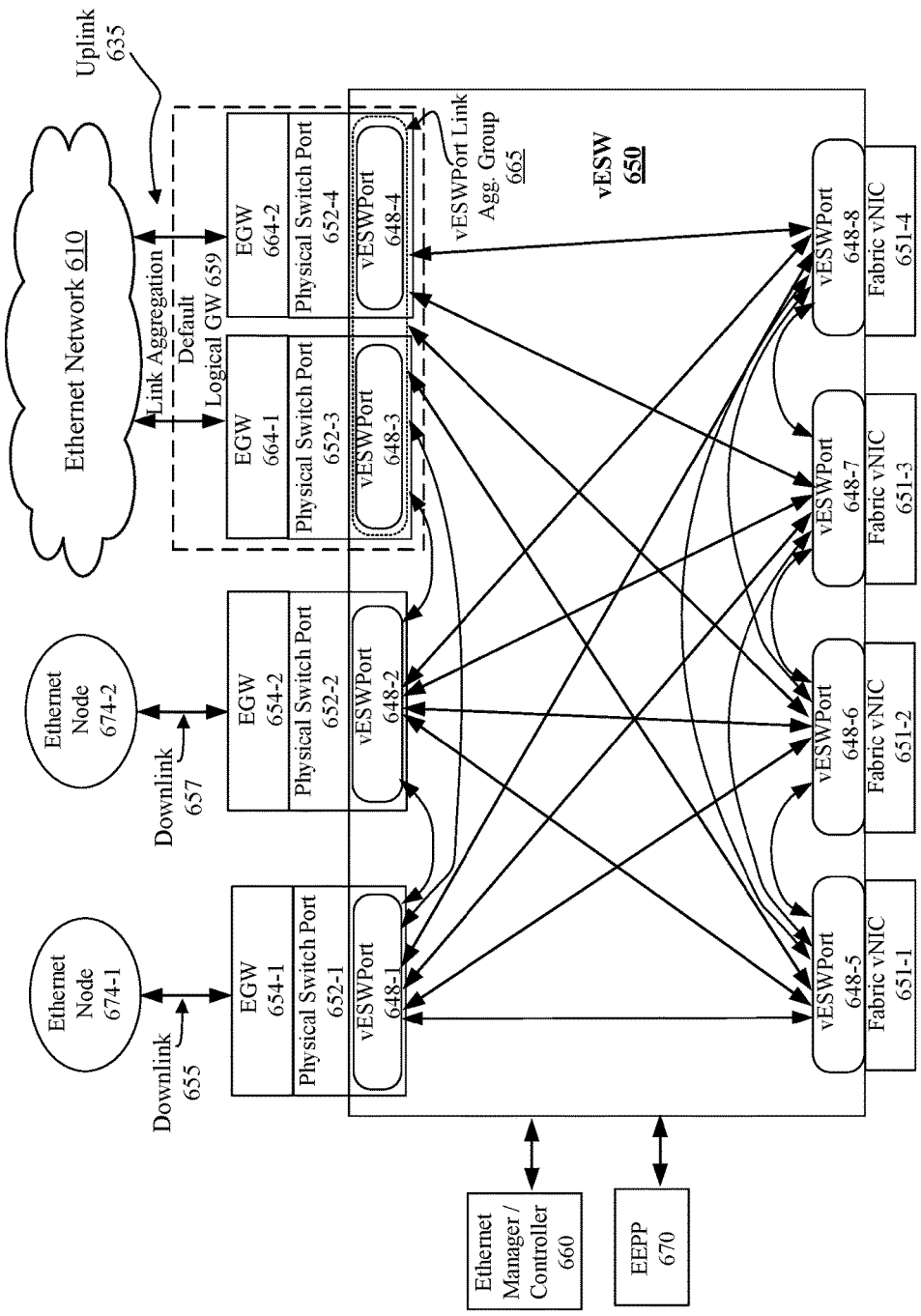
FIG. 6 illustrates an example sixth system.

FIG. 6 illustrates an example system 600. In some examples, as shown in FIG. 6, system 600 includes default logical GW 659 coupled with Ethernet Network 610 via uplink 635 and EGWs 654-1 and 654-2 coupled with Ethernet nodes 674-1 and 674-2 via respective downlinks 655 and 657. EGWs 652 and 653 may be coupled with respective physical switch ports 652-1 and 652-2 of a fabric switch (not shown). Also, EGWs 664-1 and 664-2 may couple with respective physical switch ports 652-3 and 652-4 of a same or different fabric switch. Also as shown in FIG. 6, an Ethernet manager/controller 660 and Ethernet Exception Packet Processor (EEPP) 670 may each be communicatively coupled with vESW 650. According to some examples, various double-sided arrows between vESWPorts 648-1 to 648-8 illustrate how a vESW such as vESW 650, in isolation, may be effectively an independent Ethernet network to route Ethernet packets between fabric vNICs assigned to vESW 650 through either default logical GW 659 to Ethernet network 610 or through EGWs 652-1 or 652-2 to Ethernet nodes 674-1 or 674-2.

In some examples, Ethernet manager/controller 660 may include logic and/or features to manage or configure EGWs and/or vESW 650. The management of EGWs, for example, may include link aggregation of Ethernet links coupled with EGWs 664-1 and 664-2 to couple a multi-node fabric including vESW 650 with Ethernet network 610. EGWs 664-1 and 664-2 may be configured to form default logical GW 659 to provide uplink 635. Ethernet manager/controller 660 may also include logic and/or features to separately arrange EGWs 652-1 and 652-2 to provide respective downlinks 655 and 657 with Ethernet nodes 674-1 and 674-2. Although not shown in FIG. 6, EGWs 654-1 and 654-2 may have separate physical links (e.g., Ethernet links) routed through these gateways.

As mentioned previously, a controller arranged to manage or configure a vESW, EGW or may be configured to support either centralized fabric management service or a distributed fabric management service. In some examples, for centralized fabric management, Ethernet manager/controller 660 may be configured to manage or control multiple vESWs to include vESW 650 and/or multiple EGWS/fabric managers to include EGWs 654-1, 654-2, EGWs 664-1, 6641-2, physical switch ports 652-1 to 652-4 or vESWPorts 648-1 to 648-8. For distributed fabric management, Ethernet manager/controller 660 may be configured to manage or control just vESW 650, EGWs 654-1, 654-2, EGWs 664-1, 664-2, physical switch ports 652-1 to 652-4 or vESWPorts 648-1 to 648-8 or even a portion of a larger number of vESWs, EGWs, physical switch ports including vESW 650, EGWs 654-1, 654-2, EGWs 664-1, 664-2, physical switch ports 652-1 to 652-4 or vESWPorts 648-1 to 648-8. For distributed fabric management, Ethernet manager/controller 660 may be hosted by a same node of the multi-node fabric that controls or manages vESW 650, EGWs 654-1, 654-2, EGWs 664-1, 664-2, physical switch ports 652-1 to 652-4 or the portion of vESWs, EGWs, physical switch ports or vESWPorts.

According to some examples, EEPP 670 may include logic and/or features arranged to receive packets that may change a state of vESW 650. For these examples, EEPP 670 may provide a mechanism for implementation of control plane packet processing for vESW 650. In some examples, packets forwarded as exception packets may be identified using a destination MAC address and/or an EtherType of an Ethernet packet that caused the exception. For these examples, packets that would otherwise be dropped by vESW 650 may be forwarded to EEPP 670 for remedial configuration updates to vESW 650.

Figure 7:
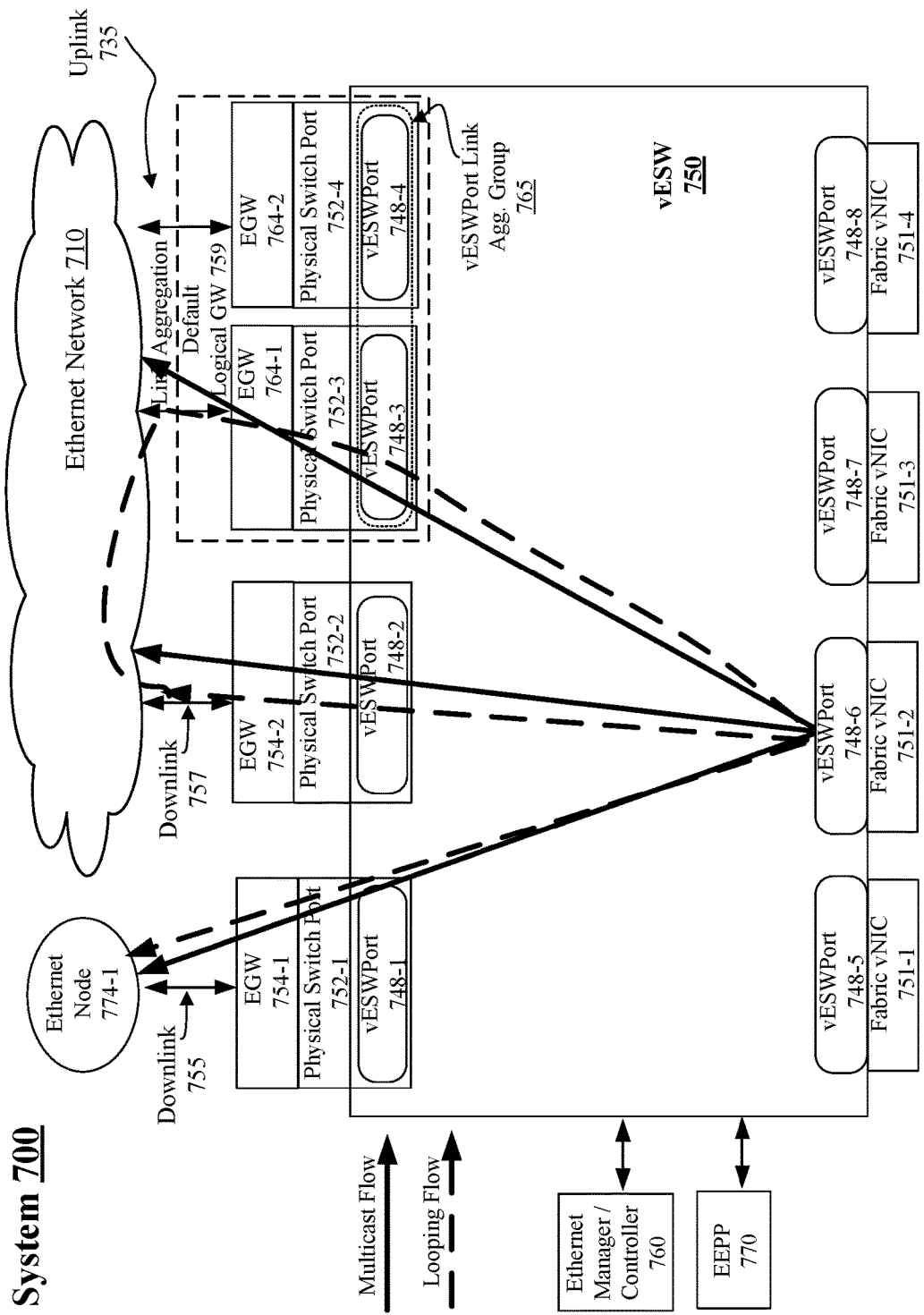
FIG. 7 illustrates an example seventh system

FIG. 7 illustrates an example system 700. In some examples, as shown in FIG. 7, system 700 includes default logical GW 759 coupled with Ethernet Network 710 via uplink 735, EGW 754-1 coupled with Ethernet node 774-1 via downlink 755 and EGW 754-2 coupled with Ethernet network 710 via downlink 757. EGWs 754-1 and 754-2 may be coupled with respective physical switch ports 752-1 and 752-2 of a fabric switch (not shown). Also EGWs 764-1 and 764-2 may couple with respective physical switch ports 752-3 and 752-4. However, for the example shown in FIG. 7, a configuration error may be caused by connecting an EGW 754-2 to Ethernet network 710 to provide downlink 757. The configuration error may cause a multicast packet from a multicast flow, shown as the solid-lined arrows routed from vESWPort 748-6 of fabric vNIC 751-2, to be transmitted out EGW 754-2 via downlink 757 and loop back into vESW 750 through EGW 764-1 via uplink 735. The looping dotted-line shown in FIG. 7 shows a looping flow due to the multicast packet continuing to loop. The looping flow may continue until the multicast packet is dropped due to congestion. This looping flow may substantially reduce data flow rates through vESW 750.

According to some examples, Ethernet manager/controller 760 may implement source MAC filtering that includes learning or configuring source MAC addresses for nodes reachable by Ethernet network 710 via EGWs 764-1 or 764-2 coupled to vESW 750 via vESWPorts 748-3 and 748-4. Ethernet manager/controller 760 may then configure default EGWs 764-1 and 764-2 to cause packets received via uplink 735 to be dropped (exclusive filtering) if these packets have a source MAC address matching a learned or configured source MAC address for nodes reachable on vESW 750. Also, Ethernet manager/controller 760 may configure EGWs 754-1 and 754-2 to cause packets received via downlinks 755 or 757 to be permitted to enter (inclusive filtering) if these packets have a source MAC address that matches a learned or configured source MAC address. In order to prevent packet looping, a particular MAC address may only be registered as a source MAC address for a single EGW coupled with a downlink and source MAC addresses of packets originating from a fabric vNIC (e.g., fabric vNIC 751-1) or received via an EGW coupled with a downlink (e.g., EGW 754-2) needs to have a learned or configured source MAC address for an EGW coupled with an uplink (e.g., EGW 764-1 or 764-2).

In some examples, an EGW included in a default logical GW 759 may process a source MAC address on a packet received via uplink 735 from Ethernet network 710 (e.g., ingress packet). If the forwarding path for that source MAC address is a learned or configured source MAC address, the EGW may drop the packet and then notify EEPP 770 and/or Ethernet manager/controller 760 that a loop may have been detected. EEPP 770 and/or Ethernet manager/controller 760 may then take remedial action that may include taking EGW 754-2 out of a forwarding state.

Figure 8:
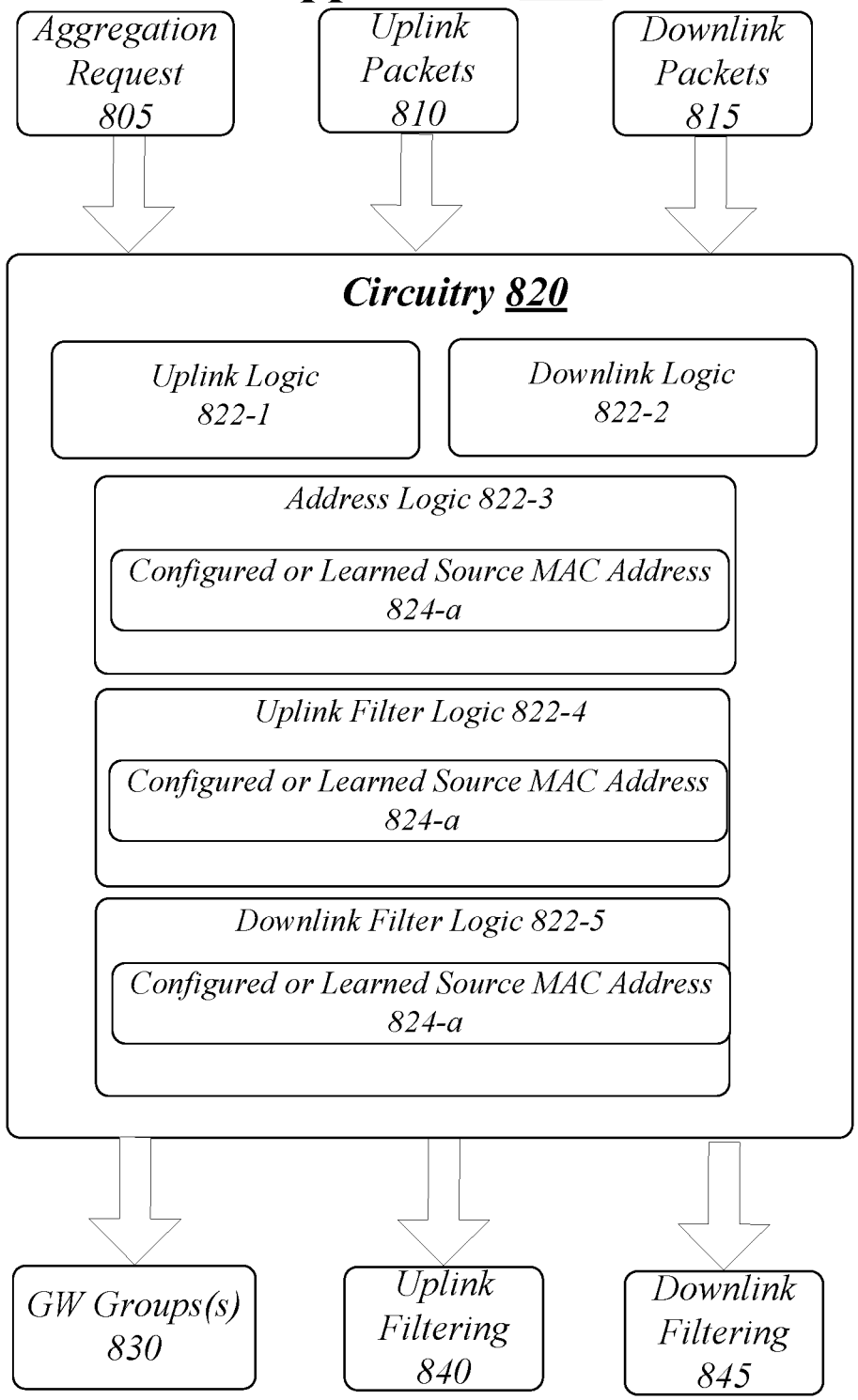
FIG. 8 illustrates an example block diagram for an apparatus.

FIG. 8 illustrates an example block diagram for apparatus 800. Although apparatus 800 shown in FIG. 8 has a limited number of elements in a certain topology, it may be appreciated that the apparatus 800 may include more or less elements in alternate topologies as desired for a given implementation.

According to some examples, apparatus 800 may be supported by circuitry 820 maintained at or hosted by a node of a multi-node fabric. The multi-node fabric may use a non-Ethernet communication protocol to transmit fabric packets between nodes. Circuitry 820 may be arranged to execute one or more software or firmware implemented modules, components or logic 822-*a* (module, component or logic may be used interchangeably in this context). It is worthy to note that "a" and "b" and "c" and similar designators as used herein are intended to be variables representing any positive integer. Thus, for example, if an implementation sets a value for a=5, then a complete set of software or firmware for components 822-*a* may include logic 822-1, 822-2, 822-3, 822-4 or 822-5. The examples presented are not limited in this context and the different variables used throughout may represent the same or different integer values. Also, "logic" may also include software/firmware stored in computer-readable media, and although logic is shown in FIG. 8 as discrete boxes, this does not limit this logic to storage in distinct computer-readable media components (e.g., a separate memory, etc.).

According to some examples, circuitry 820 may include a processor, processor circuit or processor circuitry. Circuitry 820 may be generally arranged to execute one or more software components 822-*a*. Circuitry 820 may be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 820 may also include an application specific integrated circuit (ASIC) and at least some components 822-*a* may be implemented as hardware elements of the ASIC. According to some examples, circuitry 820 may also include a field programmable gate array (FPGA) and at least some logic 822-*a* may be implemented as hardware elements of the FPGA.

According to some examples, apparatus 800 may include an uplink logic 822-1. Uplink logic 822-1 may be executed by circuitry 820 to link aggregate first Ethernet links coupled with a first group of Ethernet gateways, the first group of Ethernet gateways coupled with respective individual physical switch ports of a first fabric switch of the multi-node fabric to form a first default logical gateway to provide an uplink between the first vESW and an Ethernet network external to the multi-node fabric. For these examples, link aggregation of the first Ethernet links may be responsive to aggregation request 805 (e.g., received by a fabric or Ethernet manager). The link aggregation of the first Ethernet links may lead to GW group(s) 830 that may include a group of EGWs having the first Ethernet links to form the first default logical GW to provide the uplink between the first vESW and the Ethernet network external to the multi-node fabric.

In some examples, apparatus 800 may include a downlink logic 822-2. Downlink logic 822-2 may be executed by circuitry 820 to arrange one or more first individual EGWs coupled with respective individual physical switch ports of the first fabric switch to provide one or more respective downlinks between the first vESW and one or more first Ethernet nodes external to the multi-node fabric via respective second Ethernet links coupled with the one or more first individual EGWs.

According to some examples, apparatus 800 may also include an address logic 822-3. Address logic 822-3 may be executed by circuitry 820 to configure or learn source MAC addresses for nodes of the multi-node fabric that are reachable via the one or more first individual EGWs. For these examples, address logic 822-3 may maintain the configured or learned source MAC addresses with configured or learned source MAC address 824-*a*. Configured or learned source MAC address 824-*a* may be a data structure such as lookup table.

In some examples, apparatus 800 may also include an uplink filter logic 822-4. Uplink filter logic 822-4 may be executed by circuitry 820 to cause a first packet received via the uplink between the first virtual Ethernet switch and the external Ethernet network to be dropped if the first packet has a first source MAC address matching a configured or learned first source MAC address. For these examples, the first packet may be included in uplink packets 810. Also, uplink filter logic 822-4 may have access to configured or learned MAC address 824-*a* and may provide those addresses to EGWs for these one or more first individual EGWS to determine whether the first source MAC address matches a configured or learned first source MAC address and thus cause uplink filtering 840 that lead to the first packet being dropped.

According to some examples, apparatus 800 may also include a downlink filter logic 822-5. Downlink filter logic 822-5 may be executed by circuitry 820 to cause a second packet received via the one or more respective downlinks between the first virtual Ethernet switch and the one or more first Ethernet nodes to be permitted to enter the multi-node fabric if the second packet has a second source MAC address that matches a configured or learned second source MAC address. For these examples, the second packet may be included in downlink packets 815. Also, downlink filter logic 822-5 may have access to configured or learned MAC address 824-*a* and may provide those addresses to EGWs for these one or more first individual EGWS to determine whether the second source MAC address matches a configured or learned second source MAC address and thus cause downlink filtering 845 that lead to the second packet being permitted to enter the multi-node fabric.

Various components of apparatus 800 and a device or node implementing apparatus 800 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 9 illustrates an example logic flow 900. Logic flow 900 may be representative of some or all of the operations executed by one or more logic, features, or devices described herein, such as apparatus 900. More particularly, logic flow 900 may be implemented by at least uplink logic 822-1 or downlink logic 822-2.

According to some examples, logic flow 900 at block 902 may link aggregate, by a controller for a first vESW of a multi-node fabric, first Ethernet links coupled with a first group of Ethernet gateways, the first group of Ethernet gateways coupled with respective individual physical switch ports of a first fabric switch of the multi-node fabric to form a first default logical gateway to provide an uplink between the first vESW and an Ethernet network external to the multi-node fabric, the multi-node fabric to use a non-Ethernet communication protocol to transmit fabric packets between nodes, the first virtual Ethernet switch to receive or transmit Ethernet packets encapsulated by the non-Ethernet communication protocol used to transmit the fabric packets. For these examples, uplink logic 822-1 may link aggregate the first Ethernet links.

In some examples, logic flow 900 at block 904 may arrange one or more first individual EGWs coupled with respective individual physical switch ports of the first fabric switch to provide one or more respective downlinks between the first vESW and one or more first Ethernet nodes external to the multi-node fabric via respective second Ethernet links coupled with the one or more first individual EGWs. For these examples, downlink logic 822-2 may arrange the one or more first individual EGWs.

According to some examples, logic flow 900 at block 906 may link aggregate, by a controller for a second vESW of the multi-node fabric, third Ethernet links coupled with a second group of EGWs, the second group of Ethernet gateways coupled with respective individual physical switch ports of a second fabric switch of the multi-node fabric to form a second default logical gateway to provide an uplink between the second vESW and the Ethernet network external to the multi-node fabric. For these examples, aggregate logic 822-1 may link aggregate the third Ethernet links.

In some examples, logic flow 900 at block 908 may arrange one or more second individual EGWs coupled with respective individual physical switch ports of the second fabric switch to provide one or more respective downlinks between the second vESW and one or more second Ethernet nodes external to the multi-node fabric via respective fourth Ethernet links coupled with the one or more second individual EGWs. For these examples, downlink logic 822-2 may arrange the one or more second individual EGWs.

FIG. 10 illustrates an example storage medium 1000. As shown in FIG. 10, the first storage medium includes a storage medium 1000. The storage medium 1000 may comprise an article of manufacture. In some examples, storage medium 1000 may include any non-transitory computer readable medium or machine readable medium, such as an optical, magnetic or semiconductor storage. Storage medium 1000 may store various types of computer executable instructions, such as instructions to implement logic flow 900. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 11:
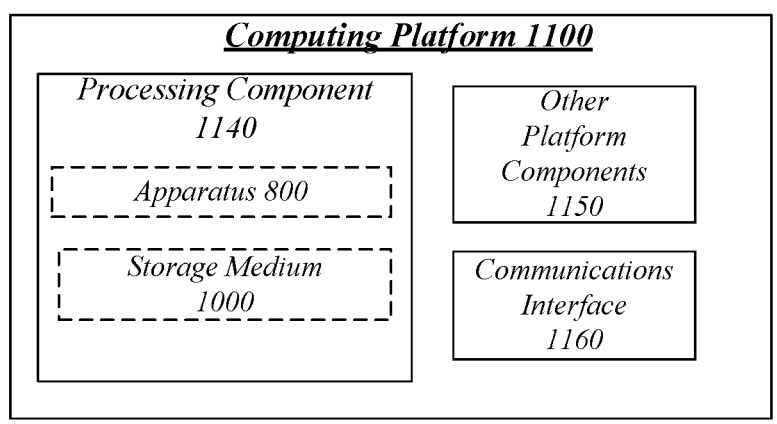
FIG. 11 illustrates an example computing platform.

FIG. 11 illustrates an example computing platform 1100. In some examples, as shown in FIG. 11, computing platform 1100 may include a processing component 1140, other platform components 1150 or a communications interface 1160. According to some examples, computing platform 1100 may host fabric management elements (e.g., Ethernet manager/controller) and/or virtual Ethernet switches for coupling to an external Ethernet network to facilitate layer-2 tunneling of Ethernet packets received from the external Ethernet network and routed through a multi-node fabric. In some examples, computing platform 1100 may be a node included in the multi-node fabric.

According to some examples, processing component 1140 may execute processing operations or logic for apparatus 800 and/or storage medium 1000. Processing component 1140 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1150 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1160 may include logic and/or features to support a communication interface. For these examples, communications interface 1160 may include one or more communication interfaces that operate according to various communication protocols or standards to communicate over direct or network communication links. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE such as IEEE 802.3. Network communication may also occur according to one or more OpenFlow specifications such as the OpenFlow Hardware Abstraction API Specification. Network communications may also occur according to Infiniband Architecture specification.

As mentioned above computing platform 1100 may be implemented in a server or client computing device. Accordingly, functions and/or specific configurations of computing platform 1100 described herein, may be included or omitted in various embodiments of computing platform 1100, as suitably desired for a server or client computing device.

The components and features of computing platform 1100 may be implemented using any combination of discrete circuitry, application specific integrated circuits (ASICs), logic gates and/or single chip architectures. Further, the features of computing platform 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled" or "coupled with", however, may also mean that two or more elements are not in direct contact with each other, but yet still co-operate or interact with each other.

The follow examples pertain to additional examples of technologies disclosed herein.

EXAMPLE 1

An example apparatus may include circuitry to control a first virtual Ethernet switch of a multi-node fabric. The multi-node fabric may use a non-Ethernet communication protocol to transmit fabric packets between nodes. The first virtual Ethernet switch may receive or transmit Ethernet packets encapsulated by the non-Ethernet communication protocol used to transmit the fabric packets. The apparatus may also include an uplink logic for execution by the circuitry to link aggregate first Ethernet links coupled with a first group of Ethernet gateways. The first group of Ethernet gateways may be coupled with respective individual physical switch ports of a first fabric switch of the multi-node fabric to form a first default logical gateway to provide an uplink between the first virtual Ethernet switch and an Ethernet network external to the multi-node fabric. The apparatus may also include a downlink logic for execution by the circuitry to arrange one or more first individual Ethernet gateways coupled with respective individual physical switch ports of the first fabric switch to provide one or more respective downlinks between the first virtual Ethernet switch and one or more first Ethernet nodes external to the multi-node fabric via respective second Ethernet links coupled with the one or more first individual Ethernet gateways.

EXAMPLE 2

The apparatus of example 1 may also include the circuitry to control a second virtual Ethernet switch of the multi-node fabric. The second virtual Ethernet switch may receive or transmit Ethernet packets encapsulated by the non-Ethernet communication protocol used to transmit the fabric packets. The apparatus may also include the uplink logic to link aggregate third Ethernet links coupled with a second group of Ethernet gateways, the second group of Ethernet gateways coupled with respective individual physical switch ports of a second fabric switch of the multi-node fabric to form a second default logical gateway to provide an uplink between the second virtual Ethernet switch and the Ethernet network external to the multi-node fabric. The apparatus may also include the downlink logic to arrange one or more second individual Ethernet gateways coupled with respective individual physical switch ports of the second fabric switch to provide one or more respective downlinks between the second virtual Ethernet switch and one or more second Ethernet nodes external to the multi-node fabric via respective fourth Ethernet links coupled with the one or more second individual Ethernet gateways.

EXAMPLE 3

The apparatus of example 2, the first virtual Ethernet switch and the second virtual Ethernet switch may be coupled through the external Ethernet network as part of a single connected layer-2 network.

EXAMPLE 4

The apparatus of example 2, the first virtual Ethernet switch and the second virtual Ethernet switch may be coupled through the external Ethernet network as different layer-3 subnets.

EXAMPLE 5

The apparatus of example 2, the circuitry to control the first virtual Ethernet switch or the second virtual Ethernet switch may include separate controllers supporting a distributed fabric management service to manage respective first and second virtual Ethernet switches at respective first and second end nodes of the multi-node fabric.

EXAMPLE 6

The apparatus of example 2, the circuitry to control the first virtual Ethernet switch or the second virtual Ethernet switch may include a same controller supporting a centralized fabric management service to manage the first and second virtual Ethernet switches.

EXAMPLE 7

The apparatus of example 1, the link aggregated first Ethernet links to communicatively couple a file server or storage server connected with the external Ethernet network with one or more compute nodes included in the multi-node fabric. For these examples, the one or more compute nodes may have respective vNICs assigned a virtual Ethernet switch identifier for the first virtual Ethernet switch.

EXAMPLE 8

The apparatus of example 1 may also include an address logic for execution by the circuitry to configure or learn source MAC addresses for nodes of the multi-node fabric that are reachable via the one or more first individual Ethernet gateways. The apparatus may also include an uplink filter logic for execution by the circuitry to cause a first packet received via the uplink between the first virtual Ethernet switch and the external Ethernet network to be dropped if the first packet has a first source MAC address matching a configured or learned first source MAC address. The apparatus may also include a downlink filter logic for execution by the circuitry to cause a second packet received via the one or more respective downlinks between the first virtual Ethernet switch and the one or more first Ethernet nodes to be permitted to enter the multi-node fabric if the second packet has a second source MAC address that matches a configured or learned second source MAC address.

EXAMPLE 9

The apparatus of example 1 may also include a digital display coupled to the circuitry to present a user interface view.

EXAMPLE 10

The apparatus of example 1, the non-Ethernet communication protocol to transmit packets between nodes of the multi-node fabric may include the non-Ethernet communication protocol based on an Omni-Path architecture communication protocol.

EXAMPLE 11

An example method may include link aggregating, by a controller for a first virtual Ethernet switch of a multi-node fabric, first Ethernet links coupled with a first group of Ethernet gateways. The first group of Ethernet gateways may be coupled with respective individual physical switch ports of a first fabric switch of the multi-node fabric to form a first default logical gateway to provide an uplink between the first virtual Ethernet switch and an Ethernet network external to the multi-node fabric. The multi-node fabric may use a non-Ethernet communication protocol to transmit fabric packets between nodes. The first virtual Ethernet switch may receive or transmit Ethernet packets encapsulated by the non-Ethernet communication protocol used to transmit the fabric packets. The method may also include arranging one or more first individual Ethernet gateways coupled with respective individual physical switch ports of the first fabric switch to provide one or more respective downlinks between the first virtual Ethernet switch and one or more first Ethernet nodes external to the multi-node fabric via respective second Ethernet links coupled with the one or more first individual Ethernet gateways.

EXAMPLE 12

The method of example 11 may also include link aggregating, by a controller for a second virtual Ethernet switch of the multi-node fabric, third Ethernet links coupled with a second group of Ethernet gateways. The second group of Ethernet gateways may be coupled with respective individual physical switch ports of a second fabric switch of the multi-node fabric to form a second default logical gateway to provide an uplink between the second virtual Ethernet switch and the Ethernet network external to the multi-node fabric. The second virtual Ethernet switch may receive or transmit Ethernet packets encapsulated by the non-Ethernet communication protocol used to transmit the fabric packets. The method may also include arranging one or more second individual Ethernet gateways coupled with respective individual physical switch ports of the second fabric switch to provide one or more respective downlinks between the second virtual Ethernet switch and one or more second Ethernet nodes external to the multi-node fabric via respective fourth Ethernet links coupled with the one or more second individual Ethernet gateways.

EXAMPLE 13

The method of example 12, the first virtual Ethernet switch and the second virtual Ethernet switch may be coupled through the external Ethernet network as part of a single connected layer-2 network.

EXAMPLE 14

The method of example 12, the first virtual Ethernet switch and the second virtual Ethernet switch may be coupled through the external Ethernet network as different layer-3 subnets.

EXAMPLE 15

The method of example 12, the controller for the first virtual Ethernet switch and the controller for the second virtual Ethernet switch may include separate controllers supporting a distributed fabric management service to manage respective first and second virtual Ethernet switches at respective first and second end node nodes of the multi-node fabric.

EXAMPLE 16

The method of example 12, the controller for the first virtual Ethernet switch and the controller for the second virtual Ethernet switch may include a same controller supporting a centralized fabric management service to manage the first and second virtual Ethernet switches.

EXAMPLE 17

The method of example 11, the link aggregated first Ethernet links to communicatively couple a file server or storage server connected with the external Ethernet network with one or more compute nodes included in the multi-node fabric. For these examples, the one or more compute nodes may have respective vNICs assigned a virtual Ethernet switch identifier for the first virtual Ethernet switch.

EXAMPLE 18

The method of example 11 may also include configuring or learning source MAC addresses for nodes of the multi-node fabric that are reachable via the one or more first individual Ethernet gateways. The method may also include dropping a first packet received via the uplink between the first virtual Ethernet switch and the external Ethernet network if the first packet has a first source MAC address matching a configured or learned first source MAC address. The method may also include permitting a second packet received via the one or more respective downlinks between the first virtual Ethernet switch and the one or more first Ethernet nodes to enter the multi-node fabric if the second packet has a second source MAC address matching a configured or learned second source MAC address.

EXAMPLE 19

The method of example 11, the non-Ethernet communication protocol to transmit packets between nodes of the multi-node fabric may include the non-Ethernet communication protocol based on an Omni-Path architecture communication protocol.

EXAMPLE 20

An example at least one machine readable medium may include a plurality of instructions that in response to being executed by a system may cause the system to carry out a method according to any one of examples 11 to 19.

EXAMPLE 21

An example apparatus may include means for performing the methods of any one of examples 11 to 19.

EXAMPLE 22

An example at least one machine readable medium may include a plurality of instructions that in response to being executed by a system may cause the system to link aggregate, by a controller for a first virtual Ethernet switch of a multi-node fabric, first Ethernet links coupled with a first group of Ethernet gateways. The first group of Ethernet gateways may be coupled with respective individual physical switch ports of a first fabric switch of the multi-node fabric to form a first default logical gateway to provide an uplink between the first virtual Ethernet switch and an Ethernet network external to the multi-node fabric. The multi-node fabric may use a non-Ethernet communication protocol to transmit fabric packets between nodes. The first virtual Ethernet switch may receive or transmit Ethernet packets encapsulated by the non-Ethernet communication protocol used to transmit the fabric packets. The instructions may also cause the system to arrange one or more first individual Ethernet gateways coupled with respective individual physical switch ports of the first fabric switch to provide one or more respective downlinks between the first virtual Ethernet switch and one or more first Ethernet nodes external to the multi-node fabric via respective second Ethernet links coupled with the one or more first individual Ethernet gateways.

EXAMPLE 23

The at least one machine readable medium of example 22, the instructions may further cause the system to link aggregate third Ethernet links coupled with a second group of Ethernet gateways. The second group of Ethernet gateways may be coupled with respective individual physical switch ports of a second fabric switch of the multi-node fabric, to form a second default logical gateway to provide an uplink between a second virtual Ethernet switch and the Ethernet network external to the multi-node fabric. The second virtual Ethernet switch may receive or transmit Ethernet packets encapsulated by the non-Ethernet communication protocol used to transmit the fabric packets. The instructions may also cause the system to arrange one or more second individual Ethernet gateways coupled with respective individual physical switch ports of the second fabric switch to provide one or more respective downlinks between the second virtual Ethernet switch and one or more second Ethernet nodes external to the multi-node fabric via respective fourth Ethernet links coupled with the one or more second individual Ethernet gateways.

EXAMPLE 24

The at least one machine readable medium of example 23, the first virtual Ethernet switch and the second virtual Ethernet switch may be coupled through the external Ethernet network as part of a single connected layer-2 network.

EXAMPLE 25

The at least one machine readable medium of example 23, the first virtual Ethernet switch and the second virtual Ethernet switch may be coupled through the external Ethernet network as different layer-3 subnets.

EXAMPLE 26

The at least one machine readable medium of example 23, the system may include separate controllers supporting a distributed fabric management service to manage respective first and second virtual Ethernet switches at respective first and second end node nodes of the multi-node fabric.

EXAMPLE 27

The at least one machine readable medium of example 23, the system may include a same controller supporting a centralized fabric management service to manage the first and second virtual Ethernet switches.

EXAMPLE 28

The at least one machine readable medium of example 23, the link aggregated first Ethernet links may communicatively couple a file server or storage server connected with the external Ethernet network with one or more compute nodes included in the multi-node fabric. For these examples, the one or more compute nodes may have respective vNICs assigned a virtual Ethernet switch identifier for the first virtual Ethernet switch.

EXAMPLE 29

The at least one machine readable medium of example 23, the instructions may further cause the system to configure or learn source MAC addresses for nodes of the multi-node fabric that are reachable via the one or more first individual Ethernet gateways. The instructions may also cause the system to cause a first packet received via the uplink between the first virtual Ethernet switch and the external Ethernet network to be dropped if the first packet has a first source MAC address matching a configured or learned first source MAC address. The instructions may also cause the system to cause a second packet received via the one or more respective downlinks between the first virtual Ethernet switch and the one or more first Ethernet nodes to be permitted enter the multi-node fabric if the second packet has a second source MAC address that matches a configured or learned second source MAC address.

EXAMPLE 30

The at least one machine readable medium of example 23, the non-Ethernet communication protocol to transmit packets between nodes of the multi-node fabric may include the non-Ethernet communication protocol based on an Omni-Path architecture communication protocol.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry to control a first virtual Ethernet switch of a multi-node fabric, the multi-node fabric to use a non-Ethernet communication protocol based on an Omni-Path architecture communication protocol to transmit fabric packets between nodes, the first virtual Ethernet switch to receive or transmit Ethernet packets encapsulated by the non-Ethernet communication protocol used to transmit the fabric packets;
   an uplink logic for execution by the circuitry to link aggregate first Ethernet links coupled with a first group of Ethernet gateways, the first group of Ethernet gateways coupled with respective individual physical switch ports of a first fabric switch of the multi-node fabric to form a first default logical gateway to provide an uplink between the first virtual Ethernet switch and an Ethernet network external to the multi-node fabric; and
   a downlink logic for execution by the circuitry to arrange one or more first individual Ethernet gateways coupled with respective individual physical switch ports of the first fabric switch to provide one or more respective downlinks between the first virtual Ethernet switch and one or more first Ethernet nodes external to the multi-node fabric via respective second Ethernet links coupled with the one or more first individual Ethernet gateways.

2. The apparatus of claim 1, comprising:
   the circuitry to control a second virtual Ethernet switch of the multi-node fabric, the second virtual Ethernet switch to receive or transmit Ethernet packets encapsulated by the non-Ethernet communication protocol used to transmit the fabric packets;
   the uplink logic to link aggregate third Ethernet links coupled with a second group of Ethernet gateways, the second group of Ethernet gateways coupled with respective individual physical switch ports of a second fabric switch of the multi-node fabric to form a second default logical gateway to provide an uplink between the second virtual Ethernet switch and the Ethernet network external to the multi-node fabric; and
   the downlink logic to arrange one or more second individual Ethernet gateways coupled with respective individual physical switch ports of the second fabric switch to provide one or more respective downlinks between the second virtual Ethernet switch and one or more second Ethernet nodes external to the multi-node fabric via respective fourth Ethernet links coupled with the one or more second individual Ethernet gateways.

3. The apparatus of claim 2, comprising the first virtual Ethernet switch and the second virtual Ethernet switch coupled through the external Ethernet network as part of a single connected layer-2 network.

4. The apparatus of claim 2, comprising the first virtual Ethernet switch and the second virtual Ethernet switch coupled through the external Ethernet network as different layer-3 subnets.

5. The apparatus of claim 2, comprising the circuitry to control the first virtual Ethernet switch or the second virtual Ethernet switch including separate controllers supporting a distributed fabric management service to manage respective first and second virtual Ethernet switches at respective first and second end nodes of the multi-node fabric.

6. The apparatus of claim 2, comprising the circuitry to control the first virtual Ethernet switch or the second virtual Ethernet switch includes a same controller supporting a centralized fabric management service to manage the first and second virtual Ethernet switches.

7. The apparatus of claim 1, comprising the link aggregated first Ethernet links to communicatively couple a file server or storage server connected with the external Ethernet network with one or more compute nodes included in the multi-node fabric, the one or more compute nodes having respective virtual network interface cards (vNICs) assigned a virtual Ethernet switch identifier for the first virtual Ethernet switch.

8. The apparatus of claim 1, comprising:
   an address logic for execution by the circuitry to configure or learn source media access control (MAC) addresses for nodes of the multi-node fabric that are reachable via the one or more first individual Ethernet gateways;
   an uplink filter logic for execution by the circuitry to cause a first packet received via the uplink between the first virtual Ethernet switch and the external Ethernet network to be dropped if the first packet has a first source MAC address matching a configured or learned first source MAC address; and
   a downlink filter logic for execution by the circuitry to cause a second packet received via the one or more respective downlinks between the first virtual Ethernet switch and the one or more first Ethernet nodes to be permitted to enter the multi-node fabric if the second packet has a second source MAC address that matches a configured or learned second source MAC address.

9. The apparatus of claim 1, comprising a digital display coupled to the circuitry to present a user interface view.

10. A method comprising:
    link aggregating, by a controller for a first virtual Ethernet switch of a multi-node fabric, first Ethernet links coupled with a first group of Ethernet gateways, the first group of Ethernet gateways coupled with respective individual physical switch ports of a first fabric switch of the multi-node fabric to form a first default logical gateway to provide an uplink between the first virtual Ethernet switch and an Ethernet network external to the multi-node fabric, the multi-node fabric to use a non-Ethernet communication protocol based on an Omni-Path architecture communication protocol to transmit fabric packets between nodes, the first virtual Ethernet switch to receive or transmit Ethernet packets encapsulated by the non-Ethernet communication protocol used to transmit the fabric packets; and
    arranging one or more first individual Ethernet gateways coupled with respective individual physical switch ports of the first fabric switch to provide one or more respective downlinks between the first virtual Ethernet switch and one or more first Ethernet nodes external to the multi-node fabric via respective second Ethernet links coupled with the one or more first individual Ethernet gateways.

11. The method of claim 10, comprising:
link aggregating, by a controller for a second virtual Ethernet switch of the multi-node fabric, third Ethernet links coupled with a second group of Ethernet gateways, the second group of Ethernet gateways coupled with respective individual physical switch ports of a second fabric switch of the multi-node fabric to form a second default logical gateway to provide an uplink between the second virtual Ethernet switch and the Ethernet network external to the multi-node fabric; and
arranging one or more second individual Ethernet gateways coupled with respective individual physical switch ports of the second fabric switch to provide one or more respective downlinks between the second virtual Ethernet switch and one or more second Ethernet nodes external to the multi-node fabric via respective fourth Ethernet links coupled with the one or more second individual Ethernet gateways.

12. The method of claim 11, comprising the first virtual Ethernet switch and the second virtual Ethernet switch coupled through the external Ethernet network as part of a single connected layer-2 network.

13. The method of claim 11, comprising the first virtual Ethernet switch and the second virtual Ethernet switch coupled through the external Ethernet network as different layer-3 subnets.

14. The method of claim 11, the controller for the first virtual Ethernet switch and the controller for the second virtual Ethernet switch comprising separate controllers supporting a distributed fabric management service to manage respective first and second virtual Ethernet switches at respective first and second end node nodes of the multi-node fabric.

15. The method of claim 11, the controller for the first virtual Ethernet switch and the controller for the second virtual Ethernet switch comprising a same controller supporting a centralized fabric management service to manage the first and second virtual Ethernet switches.

16. The method of claim 10, comprising the link aggregated first Ethernet links to communicatively couple a file server or storage server connected with the external Ethernet network with one or more compute nodes included in the multi-node fabric, the one or more compute nodes having respective virtual network interface cards (vNICs) assigned a virtual Ethernet switch identifier for the first virtual Ethernet switch.

17. The method of claim 10, comprising:
configuring or learning source media access control (MAC) addresses for nodes of the multi-node fabric that are reachable via the one or more first individual Ethernet gateways;
dropping a first packet received via the uplink between the first virtual Ethernet switch and the external Ethernet network if the first packet has a first source MAC address matching a configured or learned first source MAC address; and
permitting a second packet received via the one or more respective downlinks between the first virtual Ethernet switch and the one or more first Ethernet nodes to enter the multi-node fabric if the second packet has a second source MAC address matching a configured or learned second source MAC address.

18. At least one non-transitory machine readable medium comprising a plurality of instructions that in response to being executed by a system causes the system to:
link aggregate, by a controller for a first virtual Ethernet switch of a multi-node fabric, first Ethernet links coupled with a first group of Ethernet gateways, the first group of Ethernet gateways coupled with respective individual physical switch ports of a first fabric switch of the multi-node fabric to form a first default logical gateway to provide an uplink between the first virtual Ethernet switch and an Ethernet network external to the multi-node fabric, the multi-node fabric to use a non-Ethernet communication protocol based on an Omni-Path architecture communication protocol to transmit fabric packets between nodes, the first virtual Ethernet switch to receive or transmit Ethernet packets encapsulated by the non-Ethernet communication protocol used to transmit the fabric packets; and
arrange one or more first individual Ethernet gateways coupled with respective individual physical switch ports of the first fabric switch to provide one or more respective downlinks between the first virtual Ethernet switch and one or more first Ethernet nodes external to the multi-node fabric via respective second Ethernet links coupled with the one or more first individual Ethernet gateways.

19. The at least one non-transitory machine readable medium of claim 18, comprising the instructions to further cause the system to:
link aggregate third Ethernet links coupled with a second group of Ethernet gateways, the second group of Ethernet gateways coupled with respective individual physical switch ports of a second fabric switch of the multi-node fabric, to form a second default logical gateway to provide an uplink between a second virtual Ethernet switch and the Ethernet network external to the multi-node fabric, the second virtual Ethernet switch to receive or transmit Ethernet packets encapsulated by the non-Ethernet communication protocol used to transmit the fabric packets; and
arrange one or more second individual Ethernet gateways coupled with respective individual physical switch ports of the second fabric switch to provide one or more respective downlinks between the second virtual Ethernet switch and one or more second Ethernet nodes external to the multi-node fabric via respective fourth Ethernet links coupled with the one or more second individual Ethernet gateways.

20. The at least one non-transitory machine readable medium of claim 19, comprising the first virtual Ethernet switch and the second virtual Ethernet switch coupled through the external Ethernet network as part of a single connected layer-2 network.

21. The at least one non-transitory machine readable medium of claim 19, comprising the first virtual Ethernet switch and the second virtual Ethernet switch coupled through the external Ethernet network as different layer-3 subnets.

22. The at least one non-transitory machine readable medium of claim 19, the system comprising separate controllers supporting a distributed fabric management service to manage respective first and second virtual Ethernet switches at respective first and second end node nodes of the multi-node fabric.

23. The at least one non-transitory machine readable medium of claim 19, the system comprising a same controller supporting a centralized fabric management service to manage the first and second virtual Ethernet switches.

24. The at least one non-transitory machine readable medium of claim 19, comprising the link aggregated first Ethernet links to communicatively couple a file server or storage server connected with the external Ethernet network with one or more compute nodes included in the multi-node fabric, the one or more compute nodes having respective virtual network interface cards (vNICs) assigned a virtual Ethernet switch identifier for the first virtual Ethernet switch.

25. The at least one non-transitory machine readable medium of claim 19, comprising the instructions to further cause the system to:
- configure or learn source media access control (MAC) addresses for nodes of the multi-node fabric that are reachable via the one or more first individual Ethernet gateways;
- cause a first packet received via the uplink between the first virtual Ethernet switch and the external Ethernet network to be dropped if the first packet has a first source MAC address matching a configured or learned first source MAC address; and
- cause a second packet received via the one or more respective downlinks between the first virtual Ethernet switch and the one or more first Ethernet nodes to be permitted enter the multi-node fabric if the second packet has a second source MAC address that matches a configured or learned second source MAC address.

\* \* \* \* \*